(12) United States Patent
Hirotsune et al.

(10) Patent No.: US 6,383,595 B1
(45) Date of Patent: May 7, 2002

(54) INFORMATION RECORDING MEDIUM

(75) Inventors: Akemi Hirotsune, Higashimurayama; Motoyasu Terao, Hinode; Makoto Miyamoto, Ome; Yasushi Miyauchi, Akishima; Tetsuya Nishida, Tokyo; Keikichi Ando, Musahino; Nobuhiro Tokushuku, Yokohama; Yukio Fukui, Machida; Takehiko Yorozu, Toride; Reiji Tamura, Moriya; Yoshihiro Ikari, Toride, all of (JP)

(73) Assignees: Hitachi, Ltd., Tokyo; Hitachi Maxell, Ltd., Osaka, both of (JP)

( * ) Notice: Subject to any disclaimer, the term of this patent is extended or adjusted under 35 U.S.C. 154(b) by 0 days.

(21) Appl. No.: 09/463,817

(22) PCT Filed: Mar. 23, 1999

(86) PCT No.: PCT/JP98/03424

§ 371 Date: Feb. 1, 2000

§ 102(e) Date: Feb. 1, 2000

(87) PCT Pub. No.: WO99/06220

PCT Pub. Date: Feb. 11, 1999

(30) Foreign Application Priority Data

Aug. 1, 1997 (JP) .............................................. 9-207553
Nov. 17, 1997 (JP) .............................................. 9-314796

(51) Int. Cl.$^7$ .................................................. B32B 3/02
(52) U.S. Cl. .................... 428/64.1; 428/64.5; 428/64.6; 430/270.11
(58) Field of Search ............................... 428/64.1, 64.2, 428/64.4, 64.5, 64.6, 457, 913; 430/270.13, 495.1, 945; 369/283, 288

Primary Examiner—Elizabeth Evans
(74) Attorney, Agent, or Firm—Antonelli, Terry, Stout & Kraus, LLP

(57) ABSTRACT

An information recording medium having recording, reproducing, and rewriting characteristics better than those of prior art media. The media has a recording layer made of a material represented by the following formula: $Ge_{x-w}Sb_yTe_zM_w$, wherein $0.13 \leq x \leq 0.22$, $0.20 \leq y \leq 0.32$, $0.53 \leq z \leq 0.60$, $0 \leq w \leq 0.06$, $x+y+z=1$, and M is any one of Na, Mg, Al, P, S, Cl, L, Ca, Sc, Zn, Ga, As, Se, Br, Rb, Sr, Y, Zr, Nb, Ru, Rh, Cd, In, Sn, I, Cs, Ba, La, Hf, Ta, Re, Os, Ir, Hg, Tl, Pb, Th, U, Ag, Cr, W, Mo, Pt, Co, Ni, Pd, Si, Au, Cu, V, Mn, Fe, Ti and Bi.

24 Claims, 4 Drawing Sheets

INFORMATION RECORDING MEDIUM

TECHNICAL FIELD

The invention relates to an information recording medium which is used as an optical disk.

BACKGROUND ART

Various principles for recording information onto a thin film (recording film) by irradiating a laser beam are known. Among them, since the principle using an atomic arrangement change due to the irradiation of a laser beam such as phase transition (also called a phase change) of a film material, photodarkening, or the like is hardly accompanied with deformation of a thin film, it has a merit such that an information recording medium of a double-sided disk structure is obtained by directly adhering two disk materials. A recording film of a GeSbTe system or the like has an advantage such that information can be rewritten.

According to such a kind of recording film, however, if a mark edge recording or the like to realize a high density is performed, since erasing characteristics are insufficient, a film thickness of the recording film changes due to a flow of the recording film because of a deterioration of jitter due to the rewriting or the rewriting of a number of times exceeding $10^4$, so that a distortion occurs in a reproduction signal waveform. The flow of the recording film occurs by the reason that the recording film flows by the laser irradiation upon recording and the recording film is pressed little by little due to a deformation of a protection layer or an intermediate layer by a thermal expansion. The mark edge recording is a recording system such that an edge portion of a recording mark is made correspond to "1" of a signal and a portion between the marks and a portion in the mark are made correspond to "0".

For example, a method whereby a heat capacity is reduced by thinning the recording film and a flow of the recording film is prevented by using a principle such that an influence by an adhesion between the recording film and an adjacent layer increases has been disclosed in a literature 1, "T. Ohta et al., "Optical Data Storage", '89 Proc. SPIE, 1078, 27 (1989)". A method whereby a component of a high melting point is added into a recording film and a flow of the recording film is prevented has been disclosed in a literature 2, "Hirotsune, Terao, Miyauchi, Minemura, and Fushimi, the Record, p1000, of the 41st Meeting of Applied Physics Concerned Association". Thus, the large flow of the recording film could be suppressed. However, if the rewriting of a number of times is further repeated, a fluctuation in reflectance level occurs.

To improve overwrite jitter characteristics in the mark edge recording, a disk in which transmitted light is increased has been proposed in a literature 3, "Okubo, Murabatake, Ide, Okada, and Iwanaga, the Record, p98, of the 5th Meeting of the Society of Research of Phase Change Recording". The disk is constructed by a PC substrate/ZnS–SiO$_2$ (250 nm)/Ge$_2$Sb$_2$Te$_5$ (15 nm)/ZnS–SiO$_2$ (18 nm)/Si (65 nm).

In JP-A-8-329525, the applicant of the present invention has already disclosed the invention in which a reflection layer is constructed by two layers, a material of the reflection layer is a combination of Al and Si, and a refractive index and an attenuation coefficient of the reflection layer are specified.

Although not become prior art yet, in Japanese Patent Application No. 8-328183 (1996), the applicant of the present invention has already disclosed that Al and the like are used as main components of a first metal layer and a second metal layer and a content of Al and the like of the second metal layer is set to be larger than that of Al and the like of the first metal layer provided near a recording film.

In the specification, a term of "phase change," is used as a word including not only the phase change between crystal—amorphous but also a phase change between a fusion (change to a liquid phase) and a recrystallization and a phase change between a crystal state—a crystal state.

DISCLOSURE OF INVENTION

Any of the conventional information recording media has a problem such that in case of using it as a rewritable information recording medium of a phase transition type of a high density using the mark edge recording, an increase in jitter due to the rewriting, an increase in jitter at the time of rewriting of a number of times, and a fluctuation in reflectance level occur because erasing characteristics are insufficient.

It is, therefore, an object of the invention to provide an information recording medium in which even if the rewriting is executed or the rewriting is executed a number of times, preferable recording and reproducing characteristics are held, an increase in jitter is smaller, and a fluctuation of a reflectance level is smaller than those of a conventional medium.

(1) The medium of the invention is characterized in that it has a structure such that an information recording thin film which is formed on a substrate and records and/or reproduces information by an atomic arrangement change which occurs by receiving an irradiation of light is provided as a recording layer, at least one protection layer is provided, the protection layer and recording layer are laminated in order from the light incident side, and at least one reflection layer is subsequently laminated through at least one intermediate layer, the recording layer satisfies $$Ge_{x-w}Sb_yTe_zM_w$$

and lies within a range which satisfies 0.13≦x≦0.22, 0.20 ≦y≦0.32, 0.53≦z≦0.60, w≦0.06, and x+y+z=1 and M consists of any one of

Na, Mg, Al, P, S, Cl, K, Ca, Sc, Zn, Ga, As, Se, Br, Rb, Sr, Y, Zr, Nb, Ru, Rh, Cd, In, Sn, I, Cs, Ba, La, Hf, Ta, Re, Os, Ir, Hg, Tl, Pb, Th, U, Ag, Cr, W, Mo, Pt, Co, Ni, Pd, Si, Au, Cu, V, Mn, Fe, Ti, and Bi.

(2) The information recording medium according to (1) is characterized in that the reflection layer comprises a first reflection layer and a second reflection layer which are made of materials of different compositions.

(3) The information recording medium according to (1) is characterized in that the reflection layer comprises a first reflection layer and a second reflection layer which are made of materials in which at least ones of refractive indices or attenuation coefficients are different.

(4) The information recording medium according to any one of (1) to (3) is characterized in that the M is at least one element selected from a group including Ag, Cr, W, and Mo.

(5) The information recording medium according to any one of (1) to (3) is characterized in that the M is at least one element selected from a group including Pd, Pt, and Co.

(6) The information recording medium according to any one of (1) to (5) is characterized in that the protection layer includes a layer containing ZnS of 70 mol % or ore.

(7) The information recording medium according to any one of (1) to (5) is characterized in that the protection layer has a layer of a composition in which at least 90% or more of the total number of atoms is close to any one of (ZnS)—(SiO$_2$), (ZnS)—(Al$_2$O$_3$), (ZnS)—(Al$_2$O$_3$)—(SiO$_2$), and (ZnS)—(Ta$_2$O$_5$) or a mixture composition thereof.

(8) The information recording medium according to any one of (1) to (5) is characterized in that the protection layer has a layer made of a material containing Al—O of 70 mol % or more.

(9) The information recording medium according to any one of (1) to (5) is characterized in that the protection layer includes two layers made of materials of different compositions.

(10) The information recording medium according to any one of (1) to (5) is characterized in that the protection layer includes at least two layers of a film containing ZnS of 70 mol % or more and a film containing Al—O or Si—O of 70 mol % or more.

(11) The information recording medium according to any one of (1) to (5) is characterized in that the protection layer includes a film containing at least one of Al—O and Si—O of 70 mol % or more is provided between the film containing ZnS of 70 mol % or more and the recording film.

(12) The information recording medium according to (2) or (3) is characterized in that a component of 95% or more of the total number of atoms of the first reflection layer includes an Al alloy.

(13) The information recording medium according to (2) or (3) is characterized in that a component of 95% or more of the total number of atoms of the second reflection layer includes an Al alloy.

(14) The information recording medium according to (2) or (3) is characterized in that both the first reflection layer and the second reflection layer contain 95% or more of the total number of atoms of Al or an Al alloy, and a content of elements other than Al of the first reflection layer is larger than a content of elements other than Al of the second reflection layer.

(15) The information recording medium according to (2) or (3) is characterized in that the refractive index of the first reflection layer is larger than the refractive index of the second reflection layer, and the attenuation coefficient of the first reflection layer is smaller than the attenuation coefficient of the second reflection layer.

(16) The information recording medium according to (2) or (3) is characterized in that a component of 80% or more of the total number of atoms of the first reflection layer includes Si.

(17) The information recording medium according to (2) or (3) is characterized in that a component of 95% or more of the total number of atoms of the first reflection layer includes Si or a mixture or compound of Si and a metal element, and a component of 95% or more of the total number of atoms of the second reflection layer including an Al alloy.

(18) The information recording medium according to any one of (1) to (5) is characterized in that the intermediate layer includes a layer containing ZnS of 70 mol % or more.

(19) The information recording medium according to any one of (1) to (5) is characterized in that the intermediate layer has a layer of a composition in which 90% or more of the total number of atoms is close to any one of (ZnS)—(Al$_2$O$_3$), (ZnS)—(SiO$_2$), SiO$_2$, (Al$_2$O$_3$), and (ZnS)—(Al$_2$O$_3$)—(SiO$_2$) or a mixture composition thereof.

(20) The information recording medium according to any one of (1) to (5) is characterized in that the intermediate layer has a layer made of a material containing Al—O of 70 mol % or more.

(21) The information recording medium according to any one of (1) to (5) is characterized in that the intermediate layer includes two layers made of materials of different compositions.

(22) The information recording medium according to any one of (1) to (5) is characterized in that the intermediate layer includes at least two layers of a film containing ZnS of 70 mol % or more and a film containing at least one of Al—O and Si—O of 70 mol % or more.

(23) The information recording medium according to any one of (1) to (5) is characterized in that a film thickness of the recording film lies within a range of 10 nm or more and 30 nm or less.

(24) The information recording medium according to any one of (1) to (5) is characterized in that a film thickness of the protection layer lies within a range of 80 nm or more and 110 nm or less.

(25) The information recording medium according to any one of (1) to (5) is characterized in that a film thickness of the intermediate layer lies within a range of 10 nm or more and 30 nm or less.

(26) The information recording medium according to any one of (1) to (5) is characterized in that a film thickness of the reflection layer lies within a range of 80 nm or more and 240 nm or less.

(27) The information recording medium according to (2) or (3) is characterized in that a film thickness of the first reflection layer lies within a range of 40 nm or more and 120 nm or less.

(28) The information recording medium according to (2) or (3) is characterized in that a film thickness of the second reflection layer lies within a range of 40 nm or more and 120 nm or less.

(29) An information recording medium characterized in that an information recording thin film which is formed on a substrate and records and/or reproduces information by an atomic arrangement change which occurs by receiving an irradiation of light is provided as a recording film, a reflection layer is provided, and a reflectance change of a crystal state and/or an amorphous state is equal to or less than 5% within a wavelength range of ±50 nm or less around a wavelength adapted to record and/or reproduce as a center.

(30) An information recording medium characterized in that an information recording thin film which is formed on substrate and records and/or reproduces information by an atomic arrangement change which occurs by receiving an irradiation of light is provided as a recording film, an intermediate layer and a reflection layer are provided, and when separating into two layers at a boundary face between the recording film and the intermediate layer, a reflectance change of the reflection layer at a timing when the light enters from the intermediate layer side through the intermediate layer is equal to or less than 5% within a wavelength range of ±50 nm or less around a wavelength adapted to record and/or reproduce as a center.

(31) An information recording medium characterized in that an information recording thin film which is formed on a substrate and records and/or reproduces information by an atomic arrangement change which occurs by receiving an irradiation of light is provided as a recording film, an intermediate layer and a reflection layer are provided, and a reflectance of the protection layer at a timing when separating into two layers at a boundary face between the recording film and the intermediate layer when the light enters from the recording film side through the recording film has a minimal value within a wavelength range from a wavelength that is shorter than a wavelength adapted to record and/or reproduce by 200 nm to a wavelength that is shorter than such a wavelength by 100 nm.

(32) In the recording film, it is more preferable that a range of x satisfies ($0.15 \leq x \leq 0.20$), it is more preferable that a range of y satisfies ($0.22 \leq y \leq 0.30$), and it is more preferable that a range of z satisfies ($0.54 \leq z \leq 0.58$).

It is preferable that a content of impurity elements in the recording film is equal to or less than 5 atom % of the recording film component because a deterioration of rewriting characteristics can be reduced. It is further preferable that the content is equal to or less than 2 atom %.

It is preferable that the film thickness of the recording film is equal to 10 nm or more and is equal to 30 nm or less, more preferably, is equal to 13 nm or more and is equal to 20 nm or less.

(33) It is preferable that a mol ratio of ZnS in (ZnS)—($SiO_2$) of the first protection layer is equal to 70 mol % or more and 90 mol % or less.

The first protection layer is characterized in that it includes $(ZnS)_{80}(SiO_2)_{20}$. As a material which is substituted for $(ZnS)_{80}(SiO_2)_{20}$, it is possible to use an Si—N system material, an Si—O—N system material, an oxide such as $SiO_2$, SiO, $TiO_2$, $Al_2O_3$, $Y_2O_3$, $CeO_2$, $La_2O_3$, $In_2O_3$, GeO, $GeO_2PbO$, SnO, $SnO_2$, BeO, $Bi_2O_3$, $TeO_2$, $WO_2$, $WO_3$, $Sc_2O_3$, $Ta_2O_5$, $ZrO_2$, $Cu_2O$, MgO, or the like, a nitride such as TaN, AlN, BN, $Si_3N_4$, GeN, Al—Si—N system material (for example, $AlSiN_2$), or the like, a sulfide such as ZnS, $Sb_2S_3$, CdS, $In_2S_3$, $Ga_2S_3$, GeS, $SnS_2$, PbS, $Bi_2Se_3$, or the like, a selenide such as $SnSe_2$, $Sb_2Se_3$, CdSe, ZnSe, $In_2Se_3$, $Ga_2Se_3$, GeSe, $GeSe_2$, SnSe, PbSe, $Bi_2Se_3$, or the like, a fluoride such as $CeF_3$, $MgF_2$, $CaF_2$ or the like, Si, Ge, $TiB_2$, $B_4C$, B, C, or a material made of a composition close to the above materials. A layer of those mixture materials or a multilayer of them can be used.

The second protection layer is characterized in that it includes $Al_2O_3$. As a material which is substituted for $Al_2O_3$, $SiO_2$ or a mixture of $Al_2O_3$ and $SiO_2$ is preferable. If $SiO_2$ or $Al_2O_3$ of 70 atom % or more is contained, a reduction of the reflectance level due to the rewriting of 100,000 times is small and can be suppressed to 5% or less. If $SiO_2$ or $Al_2O_3$ of 90 atom % or more is contained, it can be suppressed to 3% or less. As a material which is substituted for $Al_2O_3$ of a second protection layer 3, $Ta_2O_5$ is subsequently preferable and $ZrO_2$—$Y_2O_3$ is subsequently preferable. In place of $Al_2O_3$ of the second protection layer, if a Cr—O system material such as $Cr_2O_3$, CrO, or the like, a Co—O system material such as $Co_2O_3$, CoO, or the like, a material of a composition close to them, or a mixture material of them is used, it is preferable because an adhesive strength between the protection layer and the recording film is strong. An Ni—O system material or a mixture material of them can be used.

It is desirable to use a nitride such as Ge—N, Si—N, or Al—N system material besides them because there is an effect such that a crystallization speed rises and an unerased remainder at a high linear velocity decreases. Even in case of forming by adding nitrogen into the recording film material, the crystallization speed rises.

In the case where the protection layer includes two or more layers of different materials as mentioned above, although the number of manufacturing steps increases, it is preferable because there are both effects such that an increase in noises is prevented and a diffusion of the protection layer material into the recording film is prevented.

As combinations of the first and second protection layers, $(ZnS)_{80}(SiO_2)_{20}$ and $Al_2O_3$ are preferable because the reflectance level change upon rewriting is small to be 3% or less. In case of $(ZnS)_{80}(SiO_2)_{20}$ and $SiO_2$, a DC erasing ratio is equal to 30 dB and preferable erasing characteristics are obtained. A combination of ZnS and any one of $SiO_2$, $Al_2O_3$, and $Ta_2O_5$ is preferable because a modulation degree is large to be 53% or more.

It is preferable that an element ratio in those compounds is equal to a ratio of a metal element and an oxygen element, for example, in the oxide or sulfide or with respect to the metal element and the sulfide element, it is equal to a ratio of 2:3 in case of $Al_2O_3$, $Y_2O_3$, and $La_2O_3$, 1:2 in case of $SiO_2$, $ZrO_2$, and $GeO_2$, 2:5 in case of $Ta_2O_5$, or 1:1 in case of ZnS or a ratio close to it. However, even if the ratio is out of such a ratio, similar effects are obtained. When the ratio is out of the above integer ratio, it is preferable that the deviation of the metal element amount is equal to or less than 10%, namely, for example, the ratio of Al and O in case of Al—O is equal to ±10% or less as an Al amount from $Al_2O_3$, the ratio of Si and O in case of Si—O is equal to ±10% or less as an Si amount from $SiO_2$, or the like. If it is deviated by 10% or more, since optical characteristics change, the modulation degree decreases by 10% or more.

It is preferable that a first protection layer 2 and the material which is substituted for the first protection layer and a second protection layer 3 and the material which is substituted for the second protection layer are 90% or more of the total number of atoms of each protection layer. When an amount of impurities other than the above material is equal to or larger than 10 atom %, deterioration of the rewriting characteristics such that the number of rewriting times decreases to ½ or less or the like occurs.

In case of such protection layers, the above effect is obtained when the film thickness of the second protection layer is equal to 2 to 30 nm and the reduction of a recording sensitivity can be suppressed to a value less than 10%, so that it is preferable. It is further preferable if the film thickness is equal to 3 nm or more and is equal to 15 nm or less.

It is desirable that the film thickness of the whole protection layer (the first protection layer and the second protection layer) is equal to 60 to 130 nm because the modulation degree upon recording can be increased to 43% or more and it is more preferable that the film thickness is equal to 80 to 110 nm.

(34) It is characterized in that the first reflection layer is made of Al—Cr. As a material of the first reflection layer in place of Al—Cr, a material such as Al—Ti, Al—Ag, Al—Cu, or the like containing an Al alloy as a main component is preferable because the jitter upon rewriting can be reduced.

It has been found that if a content of the elements except for Al in the Al alloy lies within a range of 5 atom % or more and 30 atom % or less, the characteristics at the time of rewriting of a number of times become excellent. Similar characteristics are obtained even in case of At alloys other than the above alloy.

Subsequently, it is also possible to use a layer made of a sole element such as Au, Ag, Cu, Ni, Fe, Co, Cr, Ti, Pd, Pt, W, Ta, Mo, Sb, Bi, Dy, Cd, Mn, Mg, or V, an alloy containing Au alloy, Ag alloy, Cu alloy, Pd alloy, Pt alloy, Sb—Bi, SUS, Ni—Cr, or the like as a main component, or an alloy of them. A multilayer made of those layers can be used. A composite layer of each of those elements and another material such as an oxide, a composite layer of each of those elements and another substance such as another metal, or the like can be used.

Among them, in case of an alloy having a large reflectance such as Cu alloy, Al alloy, Au alloy, or the like, a modulation degree is large and excellent reproducing characteristics are obtained. In case of the Ag alloy and the like, similar characteristics are also derived. If a content of the elements other than the main component in this case is set to a value within a range of 5 atom % or more and 30 atom % or less in a manner similar to that of the Al alloy, the rewriting characteristics are more improved.

(35) It is characterized in that the second reflection layer is made of Al—Ti. As a material of the second reflection layer in place of Al—Ti, a material such as Al—Ag, Al—Cu, Al—Cr, or the like containing an At alloy as a main component is preferable. At can be also used.

It has been found that if a content of the elements except for Al in the Al alloy lies within a range of 0.5 atom % or more and 4 atom % or less, the characteristics at the time of rewriting of a number of times and a bit error rate became preferable and are more preferable when it lies within a range of 1 atom % or more and 2 atom % or less. Similar characteristics are obtained even in case of Al alloys other than the above alloy.

Subsequently, it is also possible to use a layer made of a sole element such as Au, Ag, Cu, Al, Ni, Fe, Co, Cr, Ti, Pd, Pt, W, Ta, Mo, Sb, Bi, Dy, Cd, Mn, Mg, or V, an alloy containing Au alloy, Ag alloy, Cu alloy, Pd alloy, Pt alloy, Sb—Bi, SUS, Ni—Cr, or the like as a main component, or an alloy of them. A multilayer made of those layers can be used. A composite layer of each of those elements and another material such as an oxide, a composite layer of each of those elements and another substance such as another metal, or the like can be used.

Among them, in case of a material having a large heat conductivity such as Cu, Al, Au, Cu alloy, Al alloy, Au alloy, or the like, the disk can be easily quenched and excellent rewriting characteristics are obtained. In case of Ag, Ag alloy, and the like, similar characteristics are derived. If a content of the elements other than Cu, Au, Ag, or the like serving as a main component in this case is set to a value within a range of 0.5 atom % or more and 4 atom % or less in a manner similar to the Al alloy, the characteristics upon rewriting of a number of times and a bit error rate are improved and are more improved when it lies within a range of 1 atom % or more and 2 atom % or less.

(36) Refractive indices (n) and attenuation coefficients (k) of the materials of the first and second reflection layers are examined. Thus, if n of the first reflection layer is larger than n of the second reflection layer and k of the first reflection layer is smaller than k of the second reflection layer, the increase in jitter at the time of rewriting of 100,000 times can be suppressed to 4% or less.

It is preferable that the material of each of the first and second reflection layers is equal to or larger than 95% of the total number of atoms of each reflection layer. When an amount of impurities other than the above materials is equal to or larger than 5 atom %, deterioration of the rewriting characteristics such that the number of rewriting times is reduced to ½ or less or the like occurs.

When the film thickness of the first reflection layer or the second reflection layer is thinner than 30 nm, since the strength is weak and thermal diffusion is small and the flow of the recording film is likely to occur, the jitter of the front edge or rear edge after completion of the rewriting of 100,000 times increases to a value larger than 12%. When the film thickness is equal to 40 nm, the jitter can be reduced to 10%. When the film thickness of the first reflection layer or the second reflection layer is thicker than 150 nm, a time which is required to manufacture each reflection layer becomes long. The forming time is doubled because the manufacturing step is divided into two or more steps, two or more vacuum chambers for sputtering are provided, or the like. When the film thickness is set to 120 nm or less, since the forming time is shorter than those of the other layers, no influence is exercised on the whole forming time.

Consequently, it is preferable to set the film thickness of the first reflection layer to 30 nm or more and 150 nm or less. It is more preferable to set it to 40 nm to 120 nm. It is preferable to set the film thickness of the second reflection layer to 30 nm or more and 150 nm or less. It is more preferable to set it to 40 nm to 120 nm.

It is desirable to set the film thickness of the whole reflection layer to 60 nm or more and 300 nm or less, more preferably, 80 nm or more and 240 nm or less from a viewpoint of the strength and the forming time in a manner similar to the above. The film thickness of the whole reflection layer is equal to the sum of the film thicknesses of the first and second reflection layers. In the case where either one of the first and second reflection layers does not exist, such a whole film thickness denotes the film thickness of the remaining layer.

(37) Although the materials which have already been mentioned can be used with respect to the materials of the first and second reflection layers, by selecting a combination of them, the increase in jitter at the time of rewriting of 100,000 times can be suppressed to 4% or less and the rewriting characteristics are improved. Preferable combinations are obtained in the case where the main component elements contained in the first and second reflection layers are the same and with respect to the elements other than Al of the main component elements, a content of the second reflection layer is larger than that of the first reflection layer. For example, there are the following cases. The first reflection layer is an $Al_{94}Cr_6$ film and the second reflection layer is $Al_{99}Ti_1$. The first reflection layer is an $Al_{90}Ti_{10}$ film and the second reflection layer is $Al_{98}Ti_2$. The first reflection layer is an $Al_{75}Ti_{25}$ film and the second reflection layer is $Al_{99}Ti_1$. And the like. Even in case of a combination of Al—Ti and Al—Ti or Al—Cr and Al—Cr, or even in case of combinations other than Al—Ti and Al—Cr, similar characteristics are obtained by using a combination mainly containing an Al alloy such as Al—Ag, Al—Cu, or the like. Subsequently, in case of the Au alloy, Ag alloy, Cu alloy, or compositions close to them, the rewriting characteristics at the time of rewriting of a number of times are improved.

(38) It is characterized that the intermediate layer is made of $(ZnS)_{80}(SiO_2)_{20}$. It is preferable that a mol ratio of ZnS in (ZnS)—($SiO_2$) of the intermediate layer is equal to 70 mol % or more and is equal to 90 mol % or less. This is because when an amount of ZnS exceeds 90 mol %, noises due to a variation of a crystal grain diameter occur and, when the rewriting is performed 100,000 times, the jitter increases by 4% or more.

In ZnS, a sputtering rate is large and, if an amount of ZnS is large, the film forming time can be reduced, and when 70 mol % or more of the whole intermediate layer consists of ZnS, the film forming time of this layer can be reduced to ½ or less.

As a material which is substituted for the intermediate layer, it is possible to use an Si—N system material, an Si—O—N system material, an oxide such as $SiO_2$, SiO, $TiO_2$, $Al_2O_3$, $Y_2O_3$, $CeO_2$, $La_2O_3$, $In_2O_3$, GeO, $GeO_2$, PbO, SnO, $SnO_2$, BeO, $Bi_2O_3$, $TeO_2$, $WO_2$, $WO_3$, $Sc_2O_3$, $Ta_2O_5$, $ZrO_2$, $Cu_2O$, MgO, or the like, a nitride such as TaN, AlN, BN, $Si_3N_4$, GeN, Al—Si—N system material (for example, AlSiN$_2$), or the like, a sulfide such as ZnS, Sb$_2$S$_3$, CdS, In$_2$S$_3$, Ga$_2$S$_3$, GeS, SnS$_2$, PbS, Bi$_2$S$_3$, or the like, a selenide such as SnSe$_2$, Sb$_2$Se$_3$, CdSe, ZnSe, In$_2$Se$_3$, Ga$_2$Se$_3$, GeSe, GeSe$_2$, SnSe, PbSe, Bi$_2$Se$_3$, or the like, a fluoride such as CeF$_3$, MgF$_2$, CaF$_2$, or the like, Si, Ge, TiB$_2$, B$_4$C, B, C, or a material made of a composition close to the above materials. A layer of those mixture materials or a multilayer of them can be used.

It is preferable that an element ratio in those compounds is equal to a ratio of a metal element and an oxygen element, for example, in the oxide or sulfide or with respect to the metal element and the sulfide element, it is equal to a ratio of 2:3 in case of Al$_2$O$_3$, Y$_2$O$_3$, and La$_2$O$_3$, 1:2 in case of SiO$_2$, ZrO$_2$, and GeO$_2$, 2:5 in case of Ta$_2$O$_5$, or 1:1 in case of ZnS or a ratio close to it. However, even if the ratio is out of such a ratio, similar effects are obtained. When the ratio is out of the above integer ratio, it is preferable that the deviation of the metal element amount is equal to or less than 10 atom %, namely, for example, the ratio of Al and O in case of Al—O is equal to ±10 atom % or less as an Al amount from Al$_2$O$_3$, the ratio of Si and O in case of Si—O is equal to ±10 atom % or less as an Si amount from SiO$_2$, or the like. If it is deviated by 10 atom % or more, since optical characteristics change, the modulation degree decreases by 10% or more.

It is preferable that the intermediate layer 5 and the material which is substituted for the intermediate layer 5 are 90% or more of the total number of atoms of each intermediate layer. When an amount of impurities other than the above material is equal to or larger than 10 atom %, deterioration of the rewriting characteristics such that the number of rewriting times decreases to ½ or more or the like occurs.

When the film thickness of the intermediate layer is equal to 0 nm, namely, the intermediate layer can be omitted. In this case, since the number of layers is reduced by one, the information recording medium can be easily manufactured. However, diffusion of the reflection layer material into the recording film occurs, the unerased remainder increases, and the jitter at the time of rewriting of 100,000 times exceeds 13%. When the film thickness is thinner than 10 nm, the recording sensitivity decreases by 5% or more. Further, to suppress the flow of the recording film, it is preferable to set the film thickness to 40 nm or less. The jitter of the rear edge at the time of rewriting of 100,000 times can be suppressed to 13% or less. When the film thickness is equal to or less than 30 nm, the jitter can be suppressed to 10% or less. Thus, if the film thickness of the intermediate layer is set to 10 to 30 nm, the recording and reproducing characteristics are more improved and it is preferable.

(39) It is characterized in that the substrate is made of a polycarbonate substrate directly having a tracking groove on the surface. In place of it, it is possible to use a chemical strengthening glass or the like in which polyolefin, epoxy, acrylate resin, or ultraviolet hardening resin layer has been formed on the surface.

The substrate having the tracking groove is a substrate having a groove whose depth is equal to $\lambda/10n'$ (n' is a refractive index of the substrate material) or more on all of or a part of the substrate surface when a recording/reproducing wavelength is set to $\lambda$. The groove can be continuously formed by one circumference or can be divided on the halfway. A width of groove can be different in dependence on the location. It is also possible to use a substrate of a sampling servo format on which no groove portion exists, a substrate by another tracking system, a substrate by another format, or the like. It is also possible to use a substrate having a format in which the recording and reproduction can be performed to both groove portion and land portion or a substrate of a format in which the recording is performed to either of them. A disk size is not limited to 12 cm but can be set to any other size such as 13 cm, 3.5', 2.5', or the like. A thickness of disk is also not limited to 0.6 mm but can be set to any other thickness such as 1.2 mm, 0.8 mm, or the like.

In the information recording medium, two disk members are formed and second reflection layers 7 and 7' of the first and second disk members are adhered through an adhesive layer. However, in place of the second disk member, a disk member of another construction, a substrate for protection, or the like can be used. When a transmittance in a ultraviolet wavelength region of the disk members which are used for adhesion or the substrate for protection is large, the disk members can be adhered by the ultraviolet hardening resin. They can be adhered by another method.

In the information recording medium, two disk members are formed and the second reflection layers 7 and 7' of the first and second disk members are adhered through an adhesive layer. However, if the ultraviolet hardening resin of a thickness of about 10 $\mu$m is coated onto the second reflection layers 7 and 7' of the first and second disk members prior to adhering and the disk members are adhered after the ultraviolet hardening resin was hardened, an error rate can be further reduced. Although the recording and reproducing characteristics and the like are improved even by merely setting each of the film thickness and the material of each layer into a sole preferable range, by combining the preferable ranges, the effect is further raised.

(40) It is characterized in that the recording film is made of Ag—Ge—Sb—Te.

It is preferable to set the range of z to $0 \leq z \leq 0.06$ and a range showing more excellent characteristics is set to $0 \leq z \leq 0.04$.

As an element which is added into the recording film in place of Ag, it has been found that it is difficult to increase the jitter at the time of rewriting of a number of times even if it is replaced with at least any one of Na, Mg, Al, P, S, Cl, K, Ca, Sc, Zn, Ga, As, Se, Br, Rb, Sr, Y, Zr, Nb, Ru, Rh, Cd, In, Sn, I, Cs, Ba, La, Hf, Ta, Re, Os, Ir, Hg, Tl, Pb, Th, U, Cr, W, Mo, Pt, Co, Ni, Pd, Si, Au, Cu, V, Mn, Fe, Ti, and Bi.

There are effects such that among them, particularly, when Ag is added, the recording sensitivity is also improved by 10% as compared with that in case of Ge—Sb—Te, when at least any one of Cr, W, and Mo is added, the jitter increases by 5% or more and the number of rewriting times is improved by three times or more when the rewriting is performed a number of times as compared with those in case of Ge—Sb—Te, and when at least any one of Pt, Co, and Pd is added, the crystallization temperature rises by 50° C. or more as compared with that in case of Ge—Sb—Te.

(41) It is characterized in that the first protection layer is made of (Al$_2$O$_3$)$_{70}$(ZnS)$_{10}$(SiO$_2$)$_{20}$.

It is preferable that 70 atom % or more of the total number of atoms of the protection layer component is Al—O because the reduction of the reflectance level can be suppressed to 5% or less. In ZnS, a sputtering rate is large and, if an amount of ZnS is large, the film forming time can be reduced, and when 70 mol % or more of the whole protection layer consists of ZnS, the film forming time of the protection layer can be reduced to ½ or less.

As a material which is substituted for Al$_2$O$_3$ in the (Al$_2$O$_3$)$_{70}$(ZnS)$_{10}$(SiO$_2$)$_{20}$ mixture material, SiO$_2$ or a mixture material of Al$_2$O$_3$ and SiO$_2$ is preferable. Ta$_2$O$_5$ is subsequently preferable and $ZrO_2$—$Y_2O_3$ or a mixture material of them and $Al_2O_3$ and $SiO_2$ is subsequently preferable.

In place of $Al_2O_3$ of the second protection layer, if a Cr—O system material such as $Cr_2O_3$, CrO, or the like, a Co—O system material such as $Co_2O_3$, CoO, or the like, a material of a composition close to them, or a mixture material of them is used, it is preferable because an adhesive strength between the protection layer and the recording film is strong.

As a material which is substituted for $(ZnS)_{30}(SiO_2)_{20}$, it is possible to use a material in which a mixture ratio of ZnS and $SiO_2$ is changed, an Si—N system material, an Si—O—N system material, an oxide such as $SiO_2$, SiO, $TiO_2$, $Al_2O_3$, $Y_2O_3$, $CeO_2$, $La_2O_3$, $In_2O_3$, GeO, $GeO_2$, PbO, SnO, $SnO_2$, BeO, $Bi_2O_3$, $TeO_2$, $WO_2$, $WO_3$, $Sc_2O_3$, $Ta_2O_5$, $ZrO_2$, $Cu_2O$, MgO, or the like, a nitride such as TaN, AlN, BN, $Si_3N_4$. GeN, Al—Si—N system material (for example, $AlSiN_2$), or the like, a sulfide such as ZnS, $Sb_2S_3$, CdS, $In_2S_3$, $Ga_2S_3$, GeS, $SnS_2$, PbS, $Bi_2S_3$. or the like, a selenide such as $SnSe_2$, $Sb_2Se_3$, CdSe, ZnSe, $In_2Se_3$, $Ga_2Se_3$, GeSe, $GeSe_2$, SnSe, PbSe, $Bi_2Se_3$l or the like, a fluoride such as $CeF_3$, $MgF_2$, $CaF_2$, or the like, Si, Ge, $TiB_2$, $B_4C$, B, C, or a material made of a composition close to the above materials. A layer of those mixture materials or a multilayer of them can be used.

In case of such a protection layer, it is preferable to set the film thickness of the whole protection layer to 80 to 110 nm because a modulation degree upon recording can be increased.

(42) It is characterized in that the first reflection layer is made of Al—Ti. As a material of the first reflection layer in place of Al—Ti, a material mainly containing an Al alloy such as Al—Cr, Al—Ag, Al—Cu, or the like is preferable.

In case of the Al alloy, if a content of the elements other than Al in the Al alloy is set to a value within a range of 5 atom % or more and 30 atom % or less, the characteristics at the time of rewriting of a number of times are further improved. Similar characteristics are obtained even in case of Al alloys other than those mentioned above.

Subsequently, it is also possible to use a layer made of a sole element such as Au, Ag, Cu, Al, Ni, Fe, Co, Cr, Ti, Pd, Pt, W, Ta, Mo, Sb, Bi, Dy, Cd, Mn, Mg, or V, an alloy containing Au alloy, Ag alloy, Cu alloy, Pd alloy, Pt alloy, Sb—Bi, SUS, Ni—Cr, or the like as a main component, or an alloy of them. A multilayer made of those layers can be used. A composite layer of each of those elements and another material such as an oxide, a composite layer of each of those elements and another substance such as another metal, or the like can be used.

Among them, in case of a material having a large reflectance such as Cu alloy, Al alloy, Au alloy, or the like, a modulation degree is large and excellent reproducing characteristics are obtained. Similar characteristics are also obtained in case of the Ag alloy or the like. If a content of the elements other than the main component such as Cu, Au, Ag, or the like serving as a main component in this case is set to a value within a range of 5 atom % or more and 30 atom % or less, the characteristics are further improved.

Although the materials which have already been mentioned can be used with respect to the combinations of the materials of the first and second reflection layers, it has been found that by selecting the combination of them, the increase in jitter at the time of rewriting of 100,000 times can be suppressed to 4% or less and the rewriting characteristics are improved. Preferable combinations are obtained in the case where the main component elements contained in the first and second reflection layers are the same and with respect to the elements other than Al of the main component elements, a content of the second reflection layer is larger than that of the first reflection layer. For example, there are the following cases. The first reflection layer is an $Al_{94}Cr_6$ film and the second reflection layer is $Al_{99}Ti_1$. The first reflection layer is an $Al_{90}Ti_{10}$ film and the second reflection layer is $Al_{98}Ti_2$. The first reflection layer is an $Al_{75}Ti_{25}$ film and the second reflection layer is $Al_{99}Ti_1$. And the like. Even in case of a combination of Al—Ti and Al—Ti or Al—Cr and Al—Cr, or even in case of combinations other than Al—Ti and Al—Cr, similar characteristics are obtained by using a combination mainly containing an Al alloy such as Al—Ag, Al—Cu, or the like. Subsequently, in case of the Au alloy, Ag alloy, Cu alloy, or compositions close to them, the rewriting characteristics at the time of rewriting of a number of times are improved.

Among them, in the case where the elements other than the main component are the same as shown in the combination in which the first reflection layer is an $Al_{90}Ti_{10}$ film and the second reflection layer is $Al_{98}Ti_2$, since the heat is likely to escape from the recording film to the reflection layer, in the jitter after completion of rewriting of 10 times, a recording power margin in which both the jitter of the front edge and the jitter of the rear edge decrease is widened by 5%.

(43) It is characterized in that the first protection layer is made of $Al_2O_3$ and $(ZnS)_{80}(SiO_2)_{20}$ and the second protection layer 3 is made of $Al_2O_3$.

It is preferable that a mol ratio of ZnS in $(ZnS)$—$(SiO_2)$ of the first protection layer 2 is equal to 70 mol % or more and is equal to 90 mol % or less.

As a material which is substituted for $(ZnS)_{80}(SiO_2)_{20}$ of the first protection layer 2, it is possible to use an Si—N system material, an Si—O—N system material, an oxide such as $SiO_2$, SiO, $TiO_2$, $Al_2O_3$, $Y_2O_3$, $CeO_2$, $La_2O_3$, $In_2O_3$, GeO, $GeO_2$, PbO, SnO, $SnO_2$, BeO, $Bi_2O_3$, $TeO_2$, $WO_2$, $WO_3$, $Sc_2O_3$, $Ta_2O_5$, $ZrO_2$, $Cu_2O$, MgO, or the like, a nitride such as TaN, AlN, BN, $Si_3N_4$, GeN, Al—Si—N system material (for example, $AlSiN_2$), or the like, a sulfide such as ZnS, $Sb_2S_3$, CdS, $In_2S_3$, $Ga_2S_3$, GeS, $SnS_2$, PbS, $Bi_2S_3$, or the like, a selenide such as $SnSe_2$, $Sb_2Se_3$l CdSe, ZnSe, $In_2Se_3$, $Ga_2Se_3$, GeSe, $GeSe_2$, SnSe, PbSe, $Bi_2Se_3$l or the like, a fluoride such as $CeF_3$, $MgF_2$, $CaF_2$, or the like, Si, Ge, $TiB_2$, $B_4C$, B, C, or a material made of a composition close to the above materials. A layer of those mixture materials or a multilayer of them can be used.

As a material which is substituted for $Al_2O_3$ of the first protection layer 2, MgO, BeO, AlN, BN, or $B_4C$ is preferable. Subsequently, $Ta_2O_5$, $SiO_2$, $ThO_2$, $TiO_2$, or SiC is preferable.

When the film thickness of this layer is set to 5 nm or more, the reflectance level change at the time of rewriting of 100,000 times can be suppressed to 10% or less. If it is set to 20 nm or more, the reflectance level change at the time of rewriting of 100,000 times can be suppressed to 5% or less. Further, if it is set to 70 nm or more, the forming time of the protection layer becomes long and the forming time is doubled because the manufacturing step is divided into two or more steps, two or more vacuum chambers for sputtering are provided, or the like. When the film thickness is set to 50 nm or less, since the forming time of the layer is shorter than those of the other layers, no influence is exercised on the whole forming time. It is, consequently, desirable to set the film thickness to 5 to 70 nm, more preferably, 20 to 50 nm.

As a material which is substituted for $Al_2O_3$ of the second protection layer 3, $SiO_2$ or a material in which a mixture ratio of $Al_2O_3$ and $SiO_2$ is changed is preferable. Subsequently, $Ta_2O_5$ is preferable. $ZrO_2$—$Y_2O_3$ is subsequently preferable.

It is preferable that an element ratio in those compounds is equal to a ratio of a metal element and an oxygen element, for example, in the oxide or sulfide or with respect to the metal element and the sulfide element, it is equal to a ratio of 2:3 in case of $Al_2O_3$, $Y_2O_3$, and $La_2O_3$, 1:2 in case of $SiO_2$, $ZrO_2$, and $GeO_2$, 2:5 in case of $Ta_2O_5$, or 1:1 in case of ZnS or a ratio close to it. However, even if the ratio is out of such a ratio, similar effects are obtained. When the ratio is out of the above integer ratio, it is preferable that the deviation of the metal element amount is equal to or less than 10 atom %, namely, for example, the ratio of Al and O in case of Al—O is equal to ±10 atom % or less as an Al amount from $Al_2O_3$, the ratio of Si and O in case of Si—O is equal to ±10 atom % or less as an Si amount from $SiO_2$, or the like. If it is deviated by 10 atom % or more, since optical characteristics change, the modulation degree decreases by 10% or more.

In place of $Al_2O_3$ of the second protection layer, if a Cr—O system material such as $Cr_2O_3$, CrO, or the like, a Co—O system material such as $Co_2O_3$, CoO, or the like, a material of a composition close to them, or a mixture material of them is used, it is preferable because an adhesive strength between the protection layer and the recording film is strong. Or, an Ni—O system material or a mixture material of them can be used.

It is desirable to use a nitride such as Ge—N, Si—N, or Al—N system material other than them because there is an effect such that the crystallization speed rises and the unerased remainder decreases at the high linear velocity. Even in case of forming the layer by adding nitrogen into the recording film material, the crystallization speed also rises.

In case of such a protection layer, it is preferable to set the film thickness of the second protection layer to 2 to 30 nm because the reduction of the recording sensitivity can be set to 10% or less and the forming time can be reduced. It is more preferable to set the film thickness to 3 nm or more and 15 nm or less. It is desirable to set the film thickness of the whole protection layer to 80 to 110 nm because the modulation degree upon recording can be increased.

(44) It is characterized in that the intermediate layer is made of two layers of $Al_2O_3$ and $(ZnS)_{80}(SiO_2)_{20}$. As a material which is substituted for $Al_2O_3$, $SiO_2$ or $Al_2O_3$—$SiO_2$ can be used. When it is changed to $SiO_2$, as compared with the case of $Al_2O_3$, although an increasing degree of the jitter at the time of rewriting of a number of times increases, even if the linear velocity upon recording is raised to about 1.5 times, a DC erasing ratio can be held to 30 dB or more. If $SiO_2$ or $Al_2O_3$ of an amount corresponding to 70 atom % or more is contained, the reduction of the reflectance level due to the rewriting of 100,000 times can be suppressed to 5% or less. When 90 atom % or more is contained, the reflectance level reduction can be suppressed to 3% or less. In place of $Al_2O_3$, $Ta_2O_5$ is subsequently preferable and $ZrO_2$—$Y_2O_3$ is subsequently preferable.

In place of $Al_2O_3$ of the intermediate layer, if a Cr—O system material such as $Cr_2O_3$, CrO, or the like, a Co—O system material such as $Co_2O_3$, CoO, or the like, a material of a composition close to them, or a mixture material of them is used, it is preferable because an adhesive strength between the protection layer and the recording film is strong. Or, an Ni—O system material or a mixture material of them can be used.

It is desirable to use a nitride such as Ge—N, Si—N, or Al—N system material other than them because there is an effect such that the crystallization speed rises and the unerased remainder decreases at the high linear velocity. Even in case of forming the layer by adding nitrogen into the recording film material, the crystallization speed also rises.

In the case where there is $Al_2O_3$ or a layer which is substituted for it, there is an effect of preventing that $(ZnS)_{80}(SiO_2)_{20}$ of the intermediate layer or a material which is substituted for it is diffused. The reduction of the reflectance level due to the rewriting of 100,000 times can be suppressed to 1% or less. In the case where the intermediate layer is made of only $Al_2O_3$ or a layer which is substituted for it, the recording sensitivity decreases by 5%. Therefore, when the intermediate layer is made of two or more layers of different materials, although the number of manufacturing steps increases, since there are both effects such that an increase in noises is prevented and the diffusion of the protection layer material into the recording film is prevented, it is preferable.

As a combination of the intermediate layer on the reflection layer side and the intermediate layer on the recording film side, in case of $(ZnS)_{80}(SiO_2)_{20}$ and $Al_2O_3$, the reflectance level change upon rewriting is small to be 1% or less and it is preferable. In case of $(ZnS)_{80}(SiO_2)_{20}$ and $SiO_2$, a DC erasing ratio is equal to 30 dB and excellent erasing characteristics are obtained. A combination of ZnS and any one of $SiO_2$, $Al_2O_3$, and $Ta_2O_5$ is preferable because a modulation degree is large to be 53% or more.

In place of using two layers of $Al_2O_3$ or a material which is substituted for $Al_2O_3$ and $(ZnS)_{80}(SiO_2)_{20}$ or a material which is substituted for $(ZnS)_{80}(SiO_2)_{20}$, if a mixture of both of them is used, although the erasing characteristics at a high linear velocity are worse as compared with those in case of using two layers, the film forming time can be reduced. In this instance, in case of (ZnS)—($Al_2O_3$)—($SiO_2$), when the linear velocity is raised by 1.1 times, the erasing ratio is equal to 30 dB or more and the film forming time is reduced to about ½ because one layer is formed. Since the erasing ratio is large, it is more preferable. If an amount of Al—O in the intermediate layer is set to 70 atom % or more of the total number of atoms, since the reflectance level change at the time of rewriting of a number of times can be reduced to 5% or less, it is more desirable.

It is preferable that a mol ratio of ZnS in (ZnS)—($SiO_2$) of the intermediate layer 5 is equal to 70 mol % or more and is equal to 90 mol % or less. This is because when ZnS exceeds 90 mol %, noises due to a variation in crystal grain diameter occur and, when the rewriting is performed 100,000 times, the jitter increases by 4% or more.

In ZnS, a sputtering rate is large and, if an amount of ZnS is large, the film forming time can be reduced, and when 70 mol % or more of the whole intermediate layer consists of ZnS, the film forming time of this layer can be reduced to ½ or less.

As a material which is substituted for (ZnS)—($SiO_2$) of the intermediate layer 5, it is possible to use an Si—N system material, an Si—O—N system material, an oxide such as $SiO_2$, SiO, $TiO_2$, $Al_2O_3$, $Y_2O_3$, $CeO_2$, $La_2O_3$, $In_2O_3$, GeO, $GeO_2$, PbO, SnO, $SnO_2$, BeO, $Bi_2O_3$, $TeO_2$, $WO_2$, $WO_3$, $Sc_2O_3$, $Ta_2O_5$, $ZrO_2$, $Cu_2O$, MgO, or the like, a nitride such as TaN, AlN, BN, $Si_3N_4$, GeN, Al—Si—N system material (for example, $AlSiN_2$), or the like, a sulfide such as ZnS, $Sb_2S_3$, CdS, $In_2S_3$, $Ga_2S_3$, GeS, $SnS_2$, PbS, $Bi_2S_3$, or the like, a selenide such as $SnSe_2$, $Sb_2Se_3$, CdSe, ZnSe, $In_2Se_3$, $Ga_2Se_3$, GeSe, $GeSe_2$, SnSe, PbSe, $Bi_2Se_3$, or the like, a fluoride such as $CeF_3$, $MgF_2$, $CaF_2$, or the like, Si, Ge, $TiB_2$, $B_4C$, B, C, or a material made of a composition close to the above materials. A layer of those mixture materials or a multilayer of them can be used.

It is preferable that an element ratio in those compounds is equal to a ratio of a metal element and an oxygen element, for example, in the oxide or sulfide or with respect to the metal element and the sulfide element, it is equal to a ratio of 2:3 in case of $Al_2O_3$, $Y_2O_3$, and $La_2O_3$, 1:2 in case of $SiO_2$, $ZrO_2$, and $GeO_2$, 2:5 in case of $Ta_2O_5$, or 1:1 in case of ZnS or a ratio close to it. However, even if the ratio is out of such a ratio, similar effects are obtained. When the ratio is out of the above integer ratio, it is preferable that the deviation of the metal element amount is equal to or less than 10%, namely, for example, the ratio of Al and O in case of Al—O is equal to ±10% or less as an Al amount from $Al_2O_3$, the ratio of Si and O in case of Si—O is equal to ±10% or less as an Si amount from $SiO_2$, or the like. If it is deviated by 10% or more, since optical characteristics change, the modulation degree decreases by 10% or more.

It is preferable that the intermediate layer 5 and the material which is substituted for the intermediate layer 5 are 90% or more of the total number of atoms of each intermediate layer. When an amount of impurities other than the above material is equal to or larger than 10 atom %, deterioration of the rewriting characteristics such that the number of rewriting times decreases to ½ or more or the like occurs.

When the film thickness of the whole intermediate layer is thinner than 10 nm, the recording sensitivity decreases by 5% or more. It is further desirable to set the film thickness to 40 nm or less in order to suppress the flow of the recording film. The jitter of the rear edge at the time of rewriting of 100,000 times can be suppressed to 13% or less. When the film thickness is equal to 30 nm or less, the jitter can be suppressed to 10% or less. Consequently, it is preferable to set the film thickness of the intermediate layer to 10 to 30 nm because the recording and reproducing characteristics are further improved.

(45) It is characterized in that the first reflection layer is made of Si. As a material of the first reflection layer in place of Si, if Au, Ag, Cu, Al, Ni, Fe, Co, Cr, Ti, Pd, Pt, W, Ta, Mo, Sb, Bi, Dy, Cd, Mn, Mg, V, Zn, Ga, Tl, Pb, C, B, S, or Ge is added into Si, a transmittance of the reflection layer decreases and an absorptance rises, so that the deterioration of the sensitivity can be prevented. In this case, if an amount of Si in the first reflection layer is equal to 80 atom % or less, the absorptance is excessively large and that if the linear velocity is raised up to 1.5 times, an increasing rate of the jitter exceeds 4%.

Among them, a material of Si—Mo or Si—Al as well as Si—Ti is more preferable because a heat conductivity of the first reflection layer can be raised and an optical constant can be set to a proper value. As for an addition amount of the element which is added into Si, it has been found that an amount within a range of 2 atom % or more and 10 atom % or less is more preferable because the reflectance level change at the time of rewriting of a number of times can be reduced to 10% or less and it is particularly desirable to set the addition amount to 3 to 6 atom %.

It is preferable that an amount of material of the first reflection layer is equal to or larger than 95% of the total number of atoms of each reflection layer. When an amount of impurities other than the above materials is equal to 5 atom % or more, there is a deterioration of the rewriting characteristics such that the number of rewriting times is reduced to ½ or less, or the like.

By adding Ti, Mo, Al, or the like into Si, the change in reflectance due to the wavelength decreases. Thus, even when the wavelength upon initialization and the recording/reproducing wavelength are different, since an initializing power can be set to a high sensitivity, it is preferable. Even when the recording wavelength and the reproducing wavelength differ, similarly, since a recording power or a reproducing power can be easily reduced, it is preferable. In case of the Si—Ge system material, since a light absorptance of the recording mark portion can be set to be smaller than that of the portion other than the recording mark, the unerased remainder due to a difference of the light absorptance can be prevented and, further, the number of rewriting times is not reduced.

As another material of the first reflection layer, a sulfide such as Cd—S, In—Se, or the like or a selenide such as Zn—Se, Cd—Se, In—Se, or the like can be used. It is desirable to set a refractive index to 3 or more. However, since the heat conductivity is low, an increase degree of the jitter due to the rewriting of 100,000 times is large.

BEST MODE FOR CARRYING OUT THE INVENTION

Figure 1:
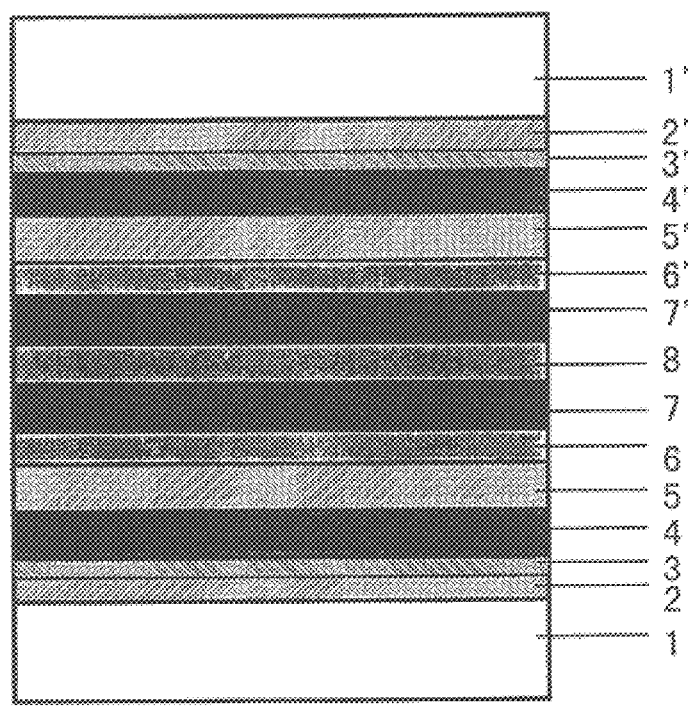
FIG. 1 is a structure cross sectional diagram of an information recording medium according to an embodiment 1 of the invention.

The invention will now be described in detail hereinbelow by embodiments.

Reference numerals which are used in the drawings are as follows.

1, 1': polycarbonate substrate
2, 2': first protection layer
3, 3': second protection layer
4, 4': recording layer
5, 5': intermediate layer
6, 6': first reflection layer
7, 7': second reflection layer
8: adhesive layer
9, 9': protection layer
10, 10': reflection layer
T: window width (Tw)
Pr: low power level
Pm: middle power level
Ph: high power level
Tc: time which is reduced at the end of a recording pulse (1) EMBODIMENT 1

Construction, Manufacturing Method

FIG. 1 shows a cross sectional structure diagram of a disk-like information recording medium according to an embodiment 1 of the invention. The medium is manufactured as follows.

First, a first protection layer 2 made of a $(ZnS)_{80}(SiO_2)_{20}$ film and having a film thickness of about 90 nm is formed on a polycarbonate substrate 1 having a diameter of 12 cm and a thickness of 0.6 mm and having a tracking groove on the surface. Subsequently, a second protection layer 3 made of an $Al_2O_3$ film having a film thickness of about 5 nm, a $Ge_{18}Sb_{26}Te_{56}$ recording layer 4 having a film thickness of about 18 nm, an intermediate layer 5 made of a $(ZnS)_{80}(SiO_2)_{20}$ film and having a film thickness of about 20 nm, a first reflection layer 6 made of an $Al_{94}Cr_6$ film and having a film thickness of about 70 nm, and a second reflection layer 7 made of an $Al_{99}Ti_1$ film and having a film thickness of about 70 nm are sequentially formed. A laminate film is formed by a magnetron sputtering apparatus, so that a first disk member is obtained.

On the other hand, a second disk member having the same construction as that of the first disk member is obtained by substantially the same method. The second disk member is formed by sequentially laminating a first protection layer 2' made of a $(ZnS)_{80}(SiO_2)_{20}$ film and having a film thickness of about 90 nm, a second protection layer 3' made of an $Al_2O_3$ film having a film thickness of about 5 nm, a $Ge_{18}Sb_{26}Te_{56}$ recording layer 4' having a film thickness of about 18 nm, an intermediate layer 5' made of a $(ZnS)_{80}(SiO_2)_{20}$ film and having a film thickness of about 20 nm, a first reflection layer 6' made of an $Al_{94}Cr_6$ film and having a film thickness of about 70 nm, and a second reflection layer 7' made of an $Al_{99}Ti_1$ film and having a film thickness of about 70 nm onto a substrate 1' having a diameter of 12 cm and a thickness of 0.6 mm.

After that, the second reflection layers 7 and 7' of the first and second disk members are adhered through an adhesive layer 8, thereby obtaining a disk-like information recording medium shown in FIG. 1.

Initial Crystallization

An initial crystallization is performed as follows to the recording layers 4 and 4' of the medium manufactured as mentioned above. Since substantially the same processes are performed with respect to the recording layer 4', only the recording layer 4 will be explained in the following description.

The medium is rotated at a linear velocity of 8 m/sec at a point on the recording track. A laser beam power of an elliptic semiconductor laser (wavelength is about 810 nm) in which a spot shape is long in the radial direction of the medium is set to 800 mW and irradiated onto the recording layer 4 through the substrate 1. A movement distance of the spot is deviated every ¼ of a spot length in the radial direction of the medium, thereby performing the initial crystallization. Although it is sufficient to perform the initial crystallization once, if it is repeated three times, an increase in noises due to the initial crystallization can be slightly reduced. The initial crystallization has an advantage such that it can be performed at a high speed.

Recording·Erasure·Reproduction

While the tracking and the automatic focusing operation are performed to a recording area of the recording layer 4 in which the initial crystallization has been completed as mentioned above, a power of a laser beam for recording is changed to a value between a middle power level Pm (5 mW) and a high power level Ph (11 mW) and information is recorded. A linear velocity of the recording track is equal to 6 m/sec, a wavelength of the semiconductor laser is equal to 660 nm, and a numerical aperture (NA) of a lens is equal to 0.6. An amorphous or a portion close to it which is formed in the recording area by the recording laser beam becomes a recording point.

Figure 3:
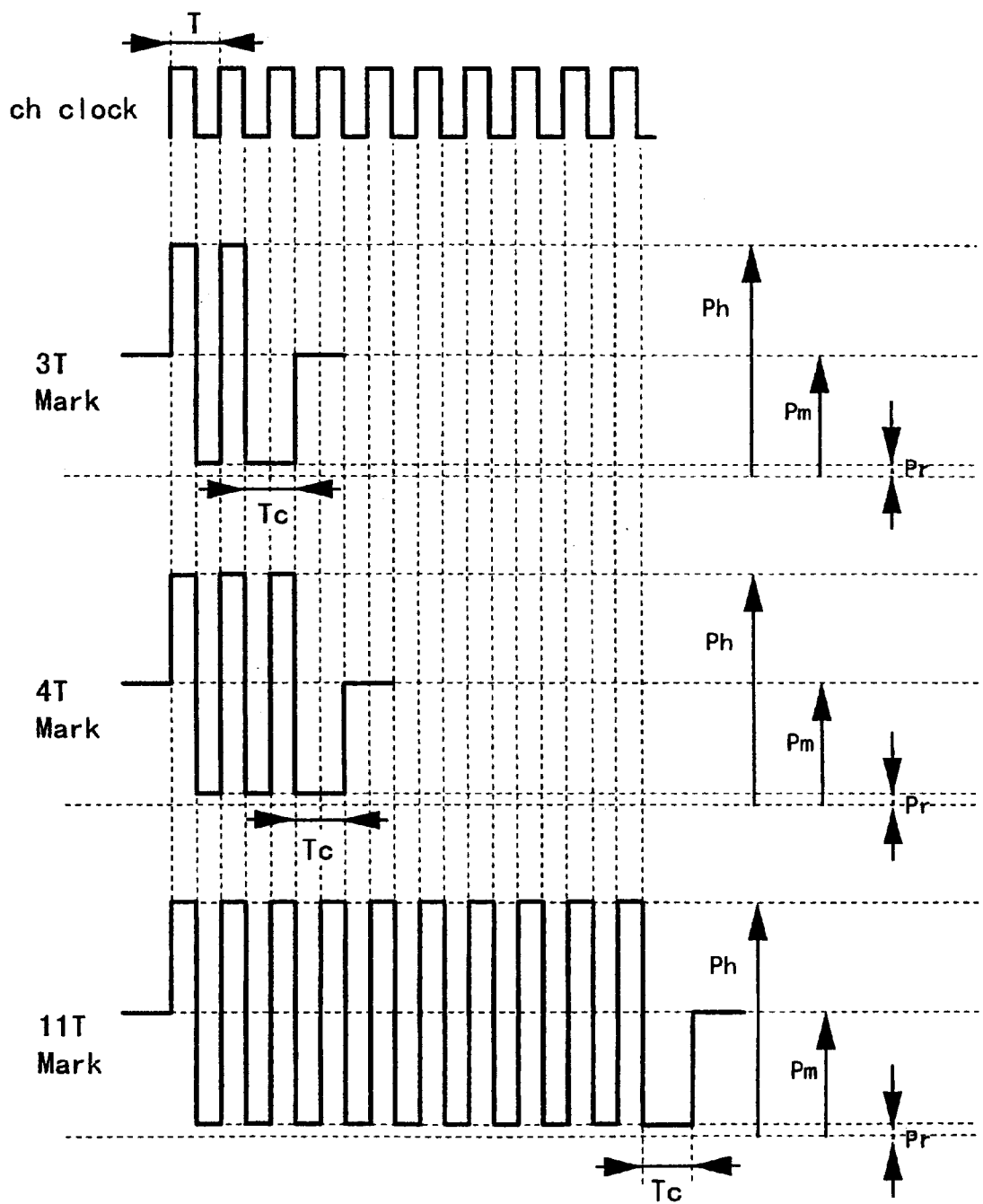
FIG. 3 is a diagram showing recording waveforms used for evaluation of recording/reproducing characteristics of the information recording medium of the invention.

It is particularly preferable that a power ratio between the high level and the middle level of the recording laser beam lies within a range from 1:0.3 to 1:0.6. The recording laser beam can be set to another power level at every short time. As shown in FIG. 3, when the recording or reproduction is performed by an apparatus having means for generating a recording waveform in which a time width Tc of a cooling pulse for repetitively reducing the power from the middle power level to the low level every half (Tw/2) of a window width during the formation of one recording mark and also reducing the power at the last of the formation of the recording mark is set to 1Tw, a particularly low jitter value of a reproduction signal waveform and an error rate are obtained. Although recording waveforms of 3Tw, 4Tw, and 11Tw are shown in the diagram, in case of recording waveforms 5Tw to 10Tw, a combination waveform which is held every Tw/2 to each of the high power level and the low power level is added one set by one before Tc of the waveform of 4Tw. The waveform to which seven sets are added is 11Tw. A length of the shortest recording mark corresponding to 3Tw is set to 0.62 μm. When the laser beam passes through a portion to be recorded, the laser beam power is reduced to a low power level Pr (1 mW) of a laser power for reproduction (reading out). Dummy data of a repetition of the 4T mark and 4T space of 55 bytes in the start portion of the information signal and 55 bytes in the end portion is included in the recording signal. A VFO of 35 bytes is included in 55 bytes of the start portion.

According to such a recording system, if new information is recorded by overwriting into the portion where information has already been recorded without erasing it, the new information is rewritten. That is, an overwrite by the single light spot of an almost circular shape can be performed.

However, it is also possible to construct such that a continuous laser beam at the middle power level (5 mW) of the power modulated recording laser beam or a power close to it is irradiated and the recorded information is once erased in the first one disk rotation or a plurality of rotations upon rewriting and, after that, the laser beam which was power modulated in accordance with the information signal between the low power level (1 mW) and the high power level (11 mW) or between the middle power level (5 mW) and the high power level (11 mW) is irradiated and information is recorded in the next one rotation. By recording information after the information was erased as mentioned above, an amount of unerased remainder of the information which has been written before is small. Therefore, the rewriting in case of raising the linear velocity to two times can be also easily performed.

The above methods are also effective in case of not only the recording film which is used in the medium of the invention but also recording films of the other media.

Figure 4:
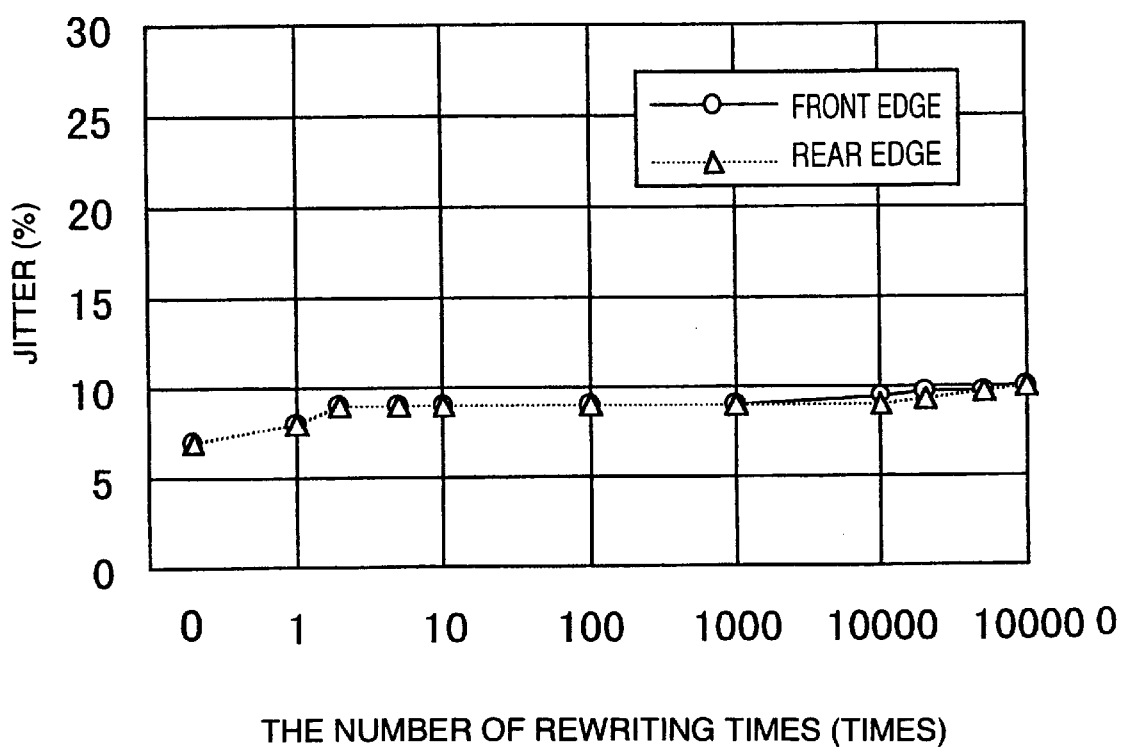
FIG. 4 is a diagram showing rewriting characteristics of the information recording medium according to the embodiment 1 of the invention.

In the information recording medium of the embodiment, when the recording and erasure are repeated, as shown in FIG. 4, the jitter (σ/Tw) is reduced by 5% as compared with that of a conventional information recording medium disclosed in an embodiment 2 when the rewriting is performed 2 to 10 times. The jitter is an index showing a degree of fluctuation of the reproduction signal from the window width (Tw) when the position of the edge portion of the recording mark is reproduced. When a value of jitter is equal to about 15%, the detecting position of the edge portion occupies most of the window width. Therefore, when the jitter value increases, the recording signal cannot be accurately reproduced. To obtain a margin as much as an increase amount of the jitter due to the apparatus, it is preferable to suppress the jitter to 12% or less in the information recording medium. If the jitter can be further reduced to 10% or less, the jitter margin of the jitter increase amount due to the apparatus increases, so that it is more preferable.

Even after the rewriting was performed 100,000 times, the jitter is reduced by 10%. In case of recording information to the information recording medium, it is generally known that about 100,000 times are necessary as the number of recording times to one position in one information recording medium. In the embodiment, therefore, the recording and reproducing characteristics at the first recording to the recording and reproducing characteristics after completion of the rewriting of 100,000 times are examined.

The window width (Tw) in the jitter measurement is equal to 34 nsec, the shortest recording signal is equal to 3 Tw, the longest recording signal is equal to 11 Tw, and they are recorded at random. A reproduction equalizing circuit is used to measure them. A width of area where a large distortion of the reproduction signal waveform occurs because the recording film flows and the film material lacks in the recording start portion and is accumulated in the end portion can be set to a value corresponding to 15 bytes or less in the start portion and to a value corresponding to 5 bytes in the end portion. In the conventional disk, they are equal to values corresponding to 25 bytes and 30 bytes, respectively.

When the intermediate layer 5 is omitted in this disk, the jitter increases at the time of rewriting of a number of times. However, the increase amount of the jitter is smaller than that in case of omitting the intermediate layer 5 in the conventional disk.

Recording Film

Among the compositions of the recording films used in the recording layers 4 and 4' in the embodiment, an amount of Te is made constant, amounts of Ge and Sb are changed, and the jitter ($\sigma$/Tw) after the rewriting of 10 times is measured. Thus, the following results are obtained.

| Recording film compositions | Jitter (%) of front edge | Jitter (%) of rear edge |
| --- | --- | --- |
| $Ge_{13}Sb_{31}Te_{56}$ | 17 | — |
| $Ge_{15}Sb_{29}Te_{56}$ | 13 | — |
| $Ge_{17}Sb_{27}Te_{56}$ | 10 | 9 |
| $Ge_{18}Sb_{26}Te_{56}$ | 9 | 9 |
| $Ge_{19}Sb_{25}Te_{56}$ | 10 | 10 |
| $Ge_{20}Sb_{24}Te_{56}$ | — | 13 |
| $Ge_{22}Sb_{22}Te_{56}$ | — | 18 |

Therefore, it has been found that when the Ge amount is increased, the jitter of the front edge decreases and the jitter of the rear edge increases. Thus, a range of x where the jitter exhibits excellent characteristics is $0.13 \leq x \leq 0.22$ and a range where better characteristics are shown is $0.15 \leq x \leq 0.20$.

Subsequently, the compositions of the recording film are changed on a line connecting $Ge_{30}Sb_{17}Te_{60}$ and $Ge_{10}Sb_{40}Te_{60}$ in a triangular diagram and the jitter ($\sigma$/Tw) after the rewriting of 10 times is measured as follows.

| Recording film compositions | Jitter (%) of front edge | Jitter (%) of rear edge |
| --- | --- | --- |
| $Ge_{23}Sb_{17}Te_{60}$ | — | 17 |
| $Ge_{21}Sb_{20}Te_{59}$ | — | 13 |
| $Ge_{20}Sb_{22}Te_{58}$ | — | 10 |
| $Ge_{19.5}Sb_{23}Te_{57.5}$ | 10 | 9 |
| $Ge_{18}Sb_{26}Te_{56}$ | 9 | 9 |
| $Ge_{16}Sb_{29}Te_{55}$ | 9 | 10 |
| $Ge_{16}Sb_{30}Te_{54}$ | 10 | — |
| $Ge_{14.5}Sb_{32}Te_{53.5}$ | 13 | — |
| $Ge_{13}Sb_{35}Te_{52}$ | 18 | — |

Therefore, it has been found that when the Sb amount is increased, the jitter of the front edge increases and the jitter of the rear edge decreases. Thus, a range of y where the jitter exhibits excellent characteristics is $0.20 \leq y \leq 0.32$ and a range where better characteristics are shown is $0.22 \leq y \leq 0.30$.

In the compositions of the recording film used in the recording layers 4 and 4' in the embodiment, the Ge amount is made constant, the Te amount and Sb amount are changed, and the jitter ($\sigma$/Tw) after the rewriting of 10 times is measured as follows.

| Recording film compositions | Jitter (%) of rear edge |
| --- | --- |
| $Ge_{18}Sb_{30}Te_{62}$ | 16 |
| $Ge_{18}Sb_{22}Te_{60}$ | 13 |
| $Ge_{18}Sb_{24}Te_{58}$ | 10 |
| $Ge_{18}Sb_{26}Te_{56}$ | 9 |
| $Ge_{18}Sb_{28}Te_{54}$ | 10 |
| $Ge_{18}Sb_{29}Te_{53}$ | 12 |
| $Ge_{18}Sb_{31}Te_{51}$ | 17 |

Thus, it has been found that even if the Te amount is increased or decreased, the jitter of the rear edge increases. Therefore, a range of z where the jitter exhibits excellent characteristics is $0.53 \leq z \leq 0.60$ and a range where better characteristics are shown is $0.54 \leq z \leq 0.58$.

It has been found that when an amount of impurity elements in the recording film exceeds 2 atom % of the recording film component, the jitter of the front edge or rear edge after the rewriting of one time exceeds 10%. Further, it has been found that when an amount of impurity elements exceeds 5 atom % of the recording film component, the jitter of the front edge or rear edge after the rewriting of one time is equal to 13% or more. Therefore, it is desirable that an amount of impurity elements in the recording film is equal to or less than 5 atom % of the recording film component because the deterioration of the rewriting characteristics can be reduced. It is further desirable to set an amount of impurity elements to 2 atom % or less.

The film thickness of the recording film used in the recording layers 4 and 4' in the embodiment is changed and the jitters ($\sigma$/Tw) after the rewriting of 10 times and after the rewriting of 100,000 times are measured. Thus, the following results are obtained. For the film thickness (nm) of the recording film, with respect to the results after the rewriting of 10 times, the worse value (%) of the jitter of the front edge or rear edge is shown, and with regard to the results after the rewriting of 100,000 times, the jitter value (%) of the front edge is shown.

| Film thickness of recording film | Jitter after rewriting of 10 times | Jitter after rewriting of 100,000 times |
|---|---|---|
| 8 | 16 | — |
| 10 | 12 | — |
| 13 | 10 | 10 |
| 18 | 9 | 10 |
| 20 | 10 | 10 |
| 30 | — | 13 |
| 40 | — | 17 |

Thus, it has been found that when the film thickness of the recording film is made thin, the jitter after the rewriting of 10 times increases due to the flow of the recording film or segregation and when the film thickness is made thick, the jitter after the rewriting of 100,000 times increases. Thus, it is preferable that the film thickness of the recording film is equal to 10 nm or more and is equal to 30 nm or less and, more preferably, it is equal to 13 nm or more and is equal to 20 nm or less.

Spectral Characteristics of the Information Recording Medium

Figure 5:
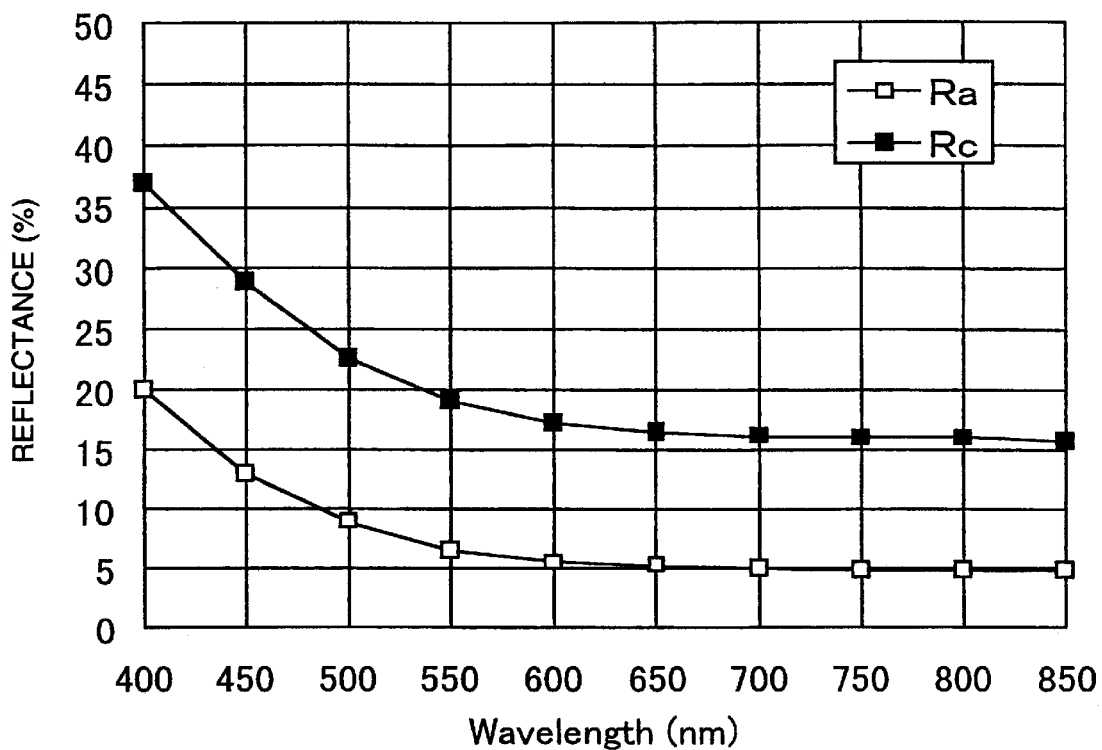
FIG. 5 is a diagram showing wavelength dependency of a reflectance of the information recording medium according to the embodiment 1 of the invention.

Two similar test pieces having substantially the same construction as that of the disk member except for a point that glass is used as a substrate are formed and spectral characteristics are examined. (FIG. 5) That is, a glass plate having a thickness of about 1 mm whose surface has been optically polished is used as a substrate. The first protection layer 2 made of a $(ZnS)_{80}(SiO_2)_{20}$ film and having a film thickness of about 90 nm, second protection layer 3 made of an $Al_2O_3$ film having a film thickness of about 5 nm, recording layer 4 made of a $Ge_{18}Sb_{26}Te_{56}$ film and having a film thickness of about 18 nm, intermediate layer 5 made of a $(ZnS)_{80}(SiO_2)_{20}$ film and having a film thickness of about 20 nm, first reflection layer 6 made of an $Al_{94}Cr_6$ film and having a film thickness of about 70 nm, and second reflection layer 7 made of an $Al_{99}Ti_1$ film and having a film thickness of about 70 nm are sequentially formed on the substrate by substantially the same method as that used for the disk.

One of the test pieces obtained in this manner is held as it is and the other is subjected to a heating process at 300° C. for 5 minutes. The light is irradiated from the substrate side to each test piece and the wavelength dependency of the reflectance is measured. The reflectance when the heating process is performed is shown by Rc in the diagram and the reflectance of the test piece in the original state (as-depo state) is shown by Ra in the diagram. When the heating process is performed (crystal state), optical characteristics similar to those in a state where the initial crystallization using the elliptic semiconductor laser beam has been performed are obtained.

In the disk having the excellent recording and reproducing characteristics mentioned in the embodiment, consequently, it has been found that in a range of wavelengths of 400 nm to 850 nm, the reflectance approaches the minimum value at a wavelength close to the recording/reproducing wavelength. If a change in reflectance in a range of 50 nm from the recording/reproducing wavelength is equal to or less than 5% in both the original state and the state after the heating process, the excellent recording and reproducing characteristics are obtained such that the jitter upon rewriting is reduced to 13% or less. If the change in reflectance is equal to or less than 5% in both the original state and the state after the heating process, the excellent recording and reproducing characteristics are obtained. In a disk in which a wavelength area where the reflectance change is equal to or less than 5% lies within a range of 100 nm, the recording and reproducing characteristics are particularly excellent.

When the spectral characteristics are measured in the disk, since there is a wavelength dependency of the light absorption of the substrate, there is a case where it is difficult to discriminate the positions of the minimal value and the maximal value. Particularly, when the wavelength is equal to or less than 650 nm, there is a tendency such that the reflectance is shown fairly lower than the actual value.

Figure 6:
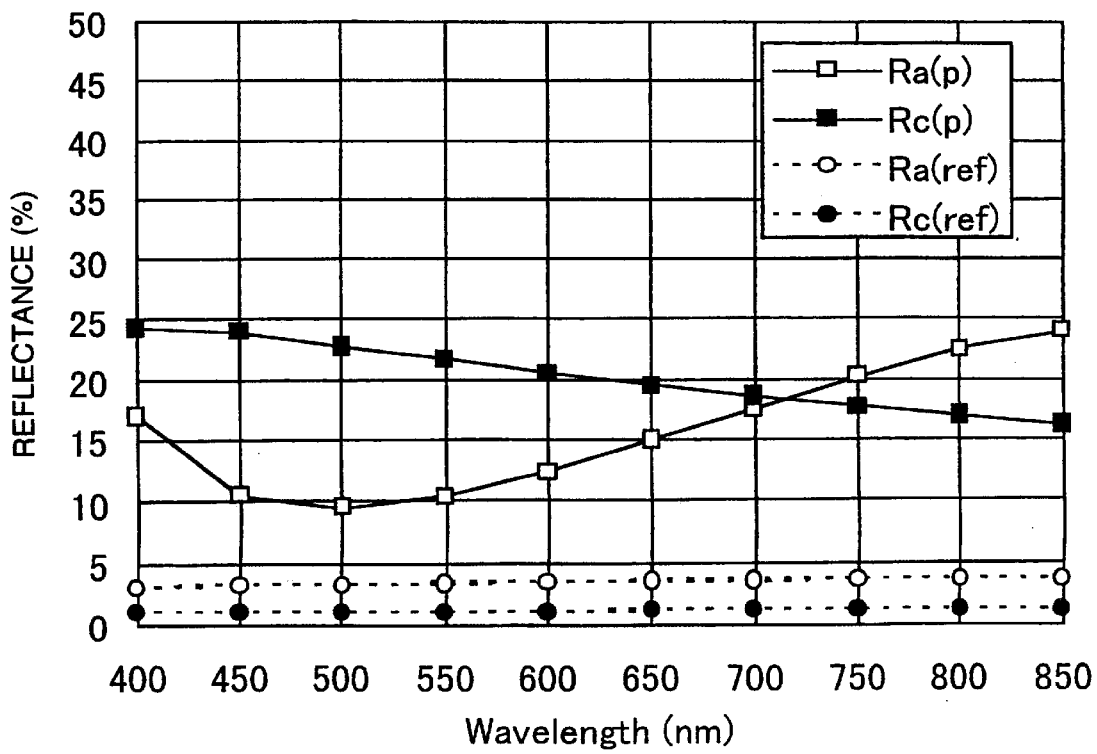
FIG. 6 is a diagram showing wavelength dependency of reflectance on the side of a reflection layer and the side of a recording film and a protection layer of the information recording medium according to the embodiment 1 of the invention.

In the disk having the excellent rewriting characteristics mentioned in the embodiment, the disk member is peeled off at a position between the recording film and the intermediate layer and the reflectance is measured from the intermediate layer side toward the reflection layer (Rc(ref), Ra(ref)). The reflectance is also measured from the recording film side toward the protection layer (Rc(p), Ra(p)). As shown in FIG. 6, as for the spectral characteristics of the disk having the excellent rewriting characteristics mentioned in the embodiment, the following characteristics different from those of the disk with the conventional structure are derived. In case of Rc(ref) and Ra(ref), it has been found that the wavelength dependency is small and the reflectance change within a range of 100 nm before and after the recording/reproducing wavelength is equal to or less than 5%. On the other hand, Rc(sub) shows a tendency such that within the range of 100 nm before and after the recording/reproducing wavelength, as the wavelength becomes longer, the reflectance decreases more. It has been found that in case of Ra(sub), the minimal value exists on the wavelength side that is shorter than the recording/reproducing wavelength by 100 to 200 nm. In the disk showing such spectral characteristics, when the jitter upon rewriting is examined, it is equal to or less than 13% and the excellent rewriting characteristics are obtained.

Protection Layer

In the embodiment, the first protection layer 2 is made of $(ZnS)_{80}(SiO_2)_{20}$ and the second protection layer 3 is made of $Al_2O_3$.

It is preferable that a mol ratio of ZnS in $(ZnS)$—$(SiO_2)$ of the first protection layer 2 is equal to 70 mol % or more and is equal to 90 mol % or less. This is because when an amount of ZnS exceeds 90 mol %, noises due to a variation of a crystal grain diameter occur and, when the rewriting is performed 100,000 times, the jitter increases by 4% or more. In ZnS, a sputtering rate is large and, if an amount of ZnS is large, the film forming time can be reduced, and when 70 mol % or more of the whole first protection layer consists of ZnS, the film forming time of this layer can be reduced to ½ or less.

As a material which is substituted for $(ZnS)_{80}(SiO_2)_{20}$ of the first protection layer 2, it is possible to use an Si—N system material, an Si—O—N system material, an oxide such as $SiO_2$, $SiO$, $TiO_2$, $Al_2O_3$, $Y_2O_3$, $CeO_2$, $La_2O_3$, $In_2O_3$, GeO, $GeO_2$, PbO, SnO, $SnO_2$, BeO, $Bi_2O_3$, $TeO_2$, $WO_2$, $WO_3$, $Sc_2O_3$, $Ta_2O_5$, $ZrO_2$, $Cu_2O$, MgO, or the like, a nitride such as TaN, AlN, BN, $Si_3N_4$, GeN, Al—Si—N system material (for example, $AlSiN_2$), or the like, a sulfide such as ZnS, $Sb_2S_3$, CdS, $In_2S_3$, $Ga_2S_3$, GeS, $SnS_2$, PbS, $Bi_2S_3$, or the like, a selenide such as $SnSe_2$, $Sb_2Se_3$, CdSe, ZnSe, $In_2Se_3$, $Ga_2Se_3$, GeSe, $GeSe_2$, SnSe, PbSe, $Bi_2Se_3$l or the like, a fluoride such as $CeF_3$, $MgF_2$, $CaF_2$, or the like, Si, Ge, TiB$_2$, B$_4$C, B, C, or a material made of a composition close to the above materials. A layer of those mixture materials or a multilayer of them can be used.

As a material which is substituted for Al$_2$O$_3$ of the second protection layer 3, SiO$_2$ or a mixture of Al$_2$O$_3$ and SiO$_2$ is preferable. If an amount of SiO$_2$ or Al$_2$O$_3$ contained is equal to 70 mol % or more, the reduction of the reflectance level due to the rewriting of 100,000 times is small and can be suppressed to 5% or less. If 90 mol % or more is contained, it can be suppressed to 3% or less. As a material which is substituted for Al$_2$O$_3$ of the second protection layer 3, Ta$_2$O$_5$ is preferable and ZrO$_2$—Y$_2$O$_3$ is subsequently preferable. When the reflectance level changes, an offset occurs in the reproduction signal level, an increase in jitter of the offset amount is added, and the jitter increases. Therefore, it is desirable that the fluctuation in reflectance level is small. In place of Al$_2$O$_3$ of the second protection layer, it is desirable to use a CR—O system material such as Cr$_2$O$_3$, CrO, or the like, a Co—O system material such as Co$_2$O$_3$, CoO, or the like, a material of a composition close to them, or a mixture material of them because an adhesive strength between the protection layer and the recording film increases. An Ni—O system material or a mixture material of them can be used.

If a nitride such as a Ge—N, Si—N, or Al—N system material is used besides them, the crystallization speed rises and there is an effect such that an amount of unerased remainder decreases at a high linear velocity larger than 6 m/sec. Even in case of forming by adding nitrogen into the recording film material, the crystallization speed rises.

When the first protection layer does not exist, the surface temperature of the substrate rises upon recording and the generation of unerasable signal components and an increase in noises occur due to the deformation of the substrate.

The second protection layer has an effect of preventing that the material of the first protection layer is diffused into the recording film. The reduction of the reflectance level due to the rewriting of 100,000 times can be suppressed to 3% or less. The reduction of the reflectance level due to the rewriting of 100,000 times when the second protection layer does not exist occurs by 25%.

In the case where the protection layer is constructed by two or more layers of different materials in this manner, although the number of manufacturing steps increases, there are both effects such that an increase in noises is prevented and the diffusion of the protection layer material into the recording film is prevented, so that it is preferable.

As combinations of the first protection layer 2 and second protection layer 3, (ZnS)$_{80}$(SiO$_2$)$_{20}$ and Al$_2$O$_3$ are preferable because the reflectance level change upon rewriting is small to be 3% or less. In case of (ZnS)$_{80}$(SiO$_2$)$_{20}$ and SiO$_2$, the DC erasing ratio is equal to 30 dB and the excellent erasing characteristics are obtained. A combination of ZnS and any one of SiO$_2$, Al$_2$O$_3$, and Ta$_2$O$_5$ is preferable because the modulation degree is large to be 53% or more.

It is preferable that an element ratio in those compounds is equal to a ratio of a metal element and an oxygen element, for example, in the oxide or sulfide or with respect to the metal element and the sulfide element, it is equal to a ratio of 2:3 in case of Al$_2$O$_3$, Y$_2$O$_3$, and La$_2$O$_3$, 1:2 in case of SiO$_2$, ZrO$_2$, and GeO$_2$, 2:5 in case of Ta$_2$O$_5$, or 1:1 in case of ZnS or a ratio close to it. However, even if the ratio is out of such a ratio, similar effects are obtained. When the ratio is out of the above integer ratio, it is preferable that the deviation of the metal element amount is equal to or less than 10 atom %, namely, for example, the ratio of Al and O in case of Al—O is equal to ±10 atom % or less as an Al amount from Al$_2$O$_3$, the ratio of Si and O in case of Si—O is equal to ±10 atom % or less as an Si amount from SiO$_2$, or the like. If it is deviated by 10 atom % or more, since optical characteristics change, the modulation degree decreases by 10% or more.

It is preferable that a first protection layer 2 and the material which is substituted for the first protection layer and a second protection layer 3 and the material which is substituted for the second protection layer are 90% or more of the total number of atoms of each protection layer. When an amount of impurities other than the above material is equal to or larger than 10 atom %, deterioration of the rewriting characteristics such that the number of rewriting times decreases to ½ or less or the like occurs.

In case of such protection layers, the above effect is obtained when the film thickness of the second protection layer is equal to 2 to 30 nm and the reduction of a recording sensitivity can be suppressed to a value less than 10%, so that it is preferable. It is further preferable if the film thickness is equal to 3 nm or more and is equal to 15 nm or less.

The film thickness of the whole protection layer (the first protection layer and the second protection layer) used in the embodiment is changed and the modulation degree is measured, so that the following results are obtained. A calculating equation of the modulation degree (Mod) is as follows.

Mod (%)=100×(Ic−Ia)/Ic

Ic: reflectance level in the crystal (erasing) state at the time of recording of an EFM signal
Ia: reflectance level in the amorphous (recording) state at the time of recording of the EFM signal

| Protection layer film thickness (nm) | Modulation degree (%) |
|---|---|
| 40 | 34 |
| 60 | 43 |
| 80 | 49 |
| 90 | 52 |
| 110 | 48 |
| 130 | 43 |
| 160 | 35 |

It is preferable that the film thickness of the whole protection layer (the first protection layer and the second protection layer) is equal to 60 to 130 nm because the modulation degree upon recording can be increased to 43% or more, and more preferably, it is set to 80 to 110 nm.

The invention is not limited to only the disk of the structure shown in the invention but even in the disk of the conventional structure or another phase change disk having a protection layer, or even when the protection layer material is replaced with the first and second protection layers disclosed in the embodiment, there is an effect of reducing the reflectance level change occurring at the time of rewriting of a number of times.

Reflection Layer

As a material of the first reflection layer in place of Al—Cr used in the first reflection layer 6 in the embodiment, a material containing an Al alloy such as Al—Ti, Al—Ag, Al—Cu, or the like as a main component is preferable because the jitter upon rewriting can be reduced.

The compositions of the first reflection layer used in the first reflection layer 6 is changed and the jitter (σ/Tw) after the rewriting of 100,000 times is measured, so that the following results are obtained.

| Compositions of 1st reflection layer | Jitter of front edge (%) | Jitter of rear edge (%) |
|---|---|---|
| $Al_{99}Cr_1$ | 18 | — |
| $Al_{97}Cr_3$ | 12 | — |
| $Al_{95}Cr_5$ | 10 | — |
| $Al_{94}Cr_6$ | 10 | 10 |
| $Al_{85}Cr_{15}$ | 10 | 10 |
| $Al_{70}Cr_{30}$ | 10 | 10 |
| $Al_{60}Cr_{40}$ | 13 | 13 |
| $Al_{50}Cr_{50}$ | 18 | 19 |

Thus, it has been found that if a content of the elements other than Al in the Al alloy is set to a value within a range of 5 atom % or more and 30 atom % or less, the characteristics at the time of rewriting of a number of times are excellent. Similar characteristics are obtained even in case of Al alloys other than those mentioned above.

Subsequently, it is also possible to use a layer made of a sole element such as Au, Ag, Cu, Ni, Fe, Co, Cr, Ti, Pd, Pt, W, Ta, Mo, Sb, Bi, Dy, Cd, Mn, Mg, or V, an alloy containing Au alloy, Ag alloy, Cu alloy, Pd alloy, Pt alloy, Sb—Bi, SUS, Ni—Cr, or the like as a main component, or an alloy of them. A multilayer made of those layers can be used. A composite layer of each of those elements and another material such as an oxide, a composite layer of each of those elements and another substance such as another metal, or the like can be used.

Among them, in case of a material having a large reflectance such as Cu alloy, At alloy, Au alloy, or the like, a modulation degree is large and excellent reproducing characteristics are obtained. Similar characteristics are also obtained in case of the Ag alloy or the like. If a content of the elements other than the main component in this case is set to a value within a range of 5 atom % or more and 30 atom % or less, the rewriting characteristics are further improved.

As a material of the second reflection layer in place of Al—Ti used in the second reflection layer 7 in the embodiment, material using an At alloy such as Al—Ag, Al—Cu, Al—Cr, or the like as a main component is preferable. Al can be also used.

The compositions of the second reflection layer used in the second reflection layer 7 are changed and the jitter (σ/Tw) after the rewriting of 100,000 times and the life by the acceleration test are measured, so that the following results are obtained. As a jitter after the rewriting of 100,000 times, an increased one of the value of the front edge and the value of the rear edge is shown. In the acceleration test, a change in bit error rate (BER) before and after each disk is inserted into a vessel of a constant temperature and a constant moisture of 90% RH at 80° C. is examined.

| Compositions of 2nd reflection layer | Jitter after rewriting of 100,000 times (%) | BER |
|---|---|---|
| Al | — | 5 times |
| $Al_{99.5}Ti_{0.5}$ | 12 | 3 times |
| $Al_{99}Ti_1$ | 10 | 2 times |
| $Al_{98.5}Ti_{1.5}$ | 10 | 1.5 times |
| $Al_{98}Ti_2$ | 10 | 1.5 times |
| $Al_{96}Ti_4$ | 13 | 1.2 times |
| $Al_{94}Ti_6$ | 17 | — |

Thus, it has been found that if a content of the elements other than Al in the Al alloy is set to a value within a range of 0.5 atom % or more and 4 atom % or less, the characteristics at the time of rewriting of a number of times and the bit error rate are excellent and that it is more preferable when the content is set to a value within a range of 1 atom % or more and 2 atom % or less. Similar characteristics are also obtained in case of the Al alloys other than those mentioned above.

Subsequently, it is also possible to use a layer made of a sole element such as Au, Ag, Cu, Al, Ni, Fe, Co, Cr, Ti, Pd, Pt, W, Ta, Mo, Sb, Bi, Dy, Cd, Mn, Mg, or V, an alloy containing Au alloy, Ag alloy, Cu alloy, Pd alloy, Pt alloy, Sb—Bi, SUS, Ni—Cr, or the like as a main component, or an alloy of them. A multilayer made of those layers can be used. A composite layer of each of those elements and another material such as an oxide, a composite layer of each of those elements and another substance such as another metal, or the like can be used.

Among them, in case of a material having a large heat conductivity such as Cu, Al, Au, Cu alloy, Al alloy, Au alloy, or the like, the disk can be easily quenched and excellent rewriting characteristics are obtained. In case of Ag, Ag alloy, and the like, similar characteristics are derived. If a content of the elements other than Cu, Au, Ag, or the like serving as a main component in this case is set to a value within a range of 0.5 atom % or more and 4 atom % or less in a manner similar to the Al alloy, the characteristics upon rewriting of a number of times and a it error rate are improved and are more improved when it lies within a range of 1 atom % or more and 2 atom % or less.

Refractive indices (n) and attenuation coefficients (k) of the materials of the first and second reflection layers are examined. Thus, in case of the combination comprising the materials in which one of them is different, the increase in jitter at the time of rewriting of 10 times can be suppressed to 4% or less. Further, if n of the first reflection layer is larger than n of the second reflection layer and k of the first reflection layer is smaller than k of the second reflection layer, the increase in jitter at the time of rewriting of 100,000 times can be suppressed to a value within 4%.

It is preferable that the material of each of the first and second reflection layers is equal to or larger than 95% of the total number of atoms of each reflection layer. When an amount of impurities other than the above materials is equal to or larger than 5 atom %, deterioration of the rewriting characteristics such that the number of rewriting times is reduced to ½ or less or the like occurs.

When the film thickness of the first reflection layer or the second reflection layer is thinner than 30 nm, since the strength is weak and thermal diffusion is small and the flow of the recording film is likely to occur, the jitter of the front edge or rear edge after completion of the rewriting of 100,000 times increases to a value larger than 12%. When the film thickness is equal to 40 nm, the jitter can be reduced to 10%. When the film thickness of the first reflection layer or the second reflection layer is thicker than 150 nm, a time which is required to manufacture each reflection layer becomes long. The forming time is doubled because the manufacturing step is divided into two or more steps, two or more vacuum chambers for sputtering are provided, or the like. When the film thickness is set to 120 nm or less, since the forming time is shorter than those of the other layers, no influence is exercised on the whole forming time.

Consequently, it is preferable to set the film thickness of the first reflection layer to 30 nm or more and 150 nm or less. It is more preferable to set it to 40 nm to 120 nm. It is preferable to set the film thickness of the second reflection layer to 30 nm or more and 150 nm or less. It is more preferable to set it to 40 nm to 120 nm.

It is desirable to set the film thickness of the whole reflection layer to 60 nm or more and 300 nm or less, more preferably, 80 nm or more and 240 nm or less from a viewpoint of the strength and the forming time in a manner similar to the above. The film thickness of the whole reflection layer is equal to the sum of the film thicknesses of the first and second reflection layers. In the case where either one of the first and second reflection layers does not exist, such a whole film thickness denotes the film thickness of the remaining layer.

Combination of the First Reflection Layer Material and the Second Reflection Layer Material Although the materials which have already been mentioned can be used with respect to the materials of the first and second reflection layers, by selecting a combination of them, the increase in jitter at the time of rewriting of 100,000 times can be suppressed to 4% or less and the rewriting characteristics are improved. Preferable combinations are obtained in the case where the main component elements contained in the first and second reflection layers are the same and with respect to the elements other than Al of the main component elements, a content of the second reflection layer is larger than that of the first reflection layer. For example, there are the following cases. The first reflection layer is an $Al_{94}Cr_6$ film and the second reflection layer is $Al_{99}Ti_1$. The first reflection layer is an $Al_{90}Ti_{10}$ film and the second reflection layer is $Al_{98}Ti_2$. The first reflection layer is an $Al_{75}Ti_{25}$ film and the second reflection layer is $Al_{99}Ti_1$. And the like. Even in case of a combination of Al—Ti and Al—Ti or Al—Cr and Al—Cr, or even in case of combinations other than Al—Ti and Al—Cr, similar characteristics are obtained by using a combination mainly containing an At alloy such as Al—Ag, Al—Cu, or the like. Subsequently, in case of the Au alloy, Ag alloy, Cu alloy, or compositions close to them, the rewriting characteristics at the time of rewriting of a number of times are improved.

Intermediate Layer, Substrate Material, etc.

In the embodiment, although the intermediate layer 5 is made of $(ZnS)_{80}(SiO_2)_{20}$, it is preferable that a mol ratio of ZnS in (ZnS)—(SiO$_2$) of the intermediate layer is equal to 70 mol % or more and is equal to 90 mol % or less. This is because when an amount of ZnS exceeds 90 mol %, noises due to a variation of a crystal grain diameter occur and, when the rewriting is performed 100,000 times, the jitter increases by 4% or more.

In ZnS, a sputtering rate is large and, if an amount of ZnS is large, the film forming time can be reduced, and when 70 mol % or more of the whole intermediate layer consists of ZnS, the film forming time of this layer can be reduced to ½ or less. Although the film forming time increases, if the lay is made of a composition close to either $SiO_2$ or $Al_2O_3$ or a mixture compositions of them, even when the linear velocity is raised to 1.2 times, the DC erasing ratio can be increased to 30 dB or more.

It is possible to use an Si—N system material, an Si—O—N system material, an oxide such as $SiO_2$, SiO, $TiO_2$, $Al_2O_3$, $Y_2O_3$, $CeO_2$, $La_2O_3$, $In_2O_3$, GeO, $GeO_2$, PbO, SnO, $SnO_2$, BeO, $Bi_2O_3$, $TeO_2$, $WO_2$, $WO_3$, $Sc_2O_3$, $Ta_2O_5$, $ZrO_2$, $Cu_2O$, MgO, the like, a nitride such as TaN, AlN, BN, $Si_3N_4$, GeN, Al—Si—N system material (for example, $AlSiN_2$), or the like, a sulfide such as ZnS, $Sb_2S_3$, CdS, $In_2S_3$, $Ga_2S_3$, GeS, $SnS_2$, PbS, $Bi_2S_3$, or the like, a selenide such as $SnSe_2$, $Sb_2Se_3$, CdSe, ZnSe, $In_2Se_3$, $Ga_2Se_3$, GeSe, $GeSe_2$, SnSe, PbSe, $Bi_2Se_3$, or the like, a fluoride such as $CeF_3$, $MgF_2$, $CaF_2$, or the like, Si, Ge, $TiB_2$, $B_4C$, B, C, or a material made of a composition close to the above materials. A layer of those mixture materials or a multilayer of them can be used.

It is preferable that an element ratio in those compounds is equal to a ratio of a metal element and an oxygen element, for example, in the oxide or sulfide or with respect to the metal element and the sulfide element, it is equal to a ratio of 2:3 in case of $Al_2O_3$, $Y_2O_3$, and $La_2O_3$, 1:2 in case of $SiO_2$, $ZrO_2$, and $GeO_2$, 2:5 in case of $Ta_2O_5$, or 1:1 in case of ZnS or a ratio close to it. However, even if the ratio is out of such a ratio, similar effects are obtained. When the ratio is out of the above integer ratio, it is preferable that the deviation of the metal element amount is equal to or less than 10 atom %, namely, for example, the ratio of Al and O n case of Al—O is equal to ±10 atom % or less as an Al amount from $Al_2O_3$, the ratio of Si and O in case of Si—O is equal to ±10 atom % or less as an Si amount from $SiO_2$, or the like. If it is deviated by 10 atom % or more, since optical characteristics change, the modulation degree decreases by 10% or more.

It is preferable that the intermediate layer 5 and the material which is substituted for the intermediate layer 5 are 90% or more of the total number of atoms of each intermediate layer. When an amount of impurities other than the above material is equal to or larger than 10 atom %, deterioration of the rewriting characteristics such that the number of rewriting times decreases to ½ or more or the like occurs.

When the film thickness of the intermediate layer is equal to 0 nm, namely, the intermediate layer can be omitted. In this case, since the number of layers is reduced by one, the information recording medium can be easily manufactured. However, diffusion of the reflection layer material into the recording film occurs, the unerased remainder increases, and the jitter at the time of rewriting of 100,000 times exceeds 13%. When the film thickness is thinner than 10 nm, the recording sensitivity decreases by 5% or more. Further, to suppress the flow of the recording film, it is preferable to set the film thickness to 40 nm or less. The jitter of the rear edge at the time of rewriting of 100,000 times can be suppressed to 13% or less. When the film thickness is equal to or less than 30 nm, the jitter can be suppressed to 10% or less. Thus, if the film thickness of the intermediate layer is set to 10 to 30 nm, the recording and reproducing characteristics are more improved and it is preferable.

In the embodiment, although the polycarbonate substrate 1 directly having a tracking groove on the surface is used, in place of it, it is possible to use a chemical strengthening glass or the like in which polyolefin, epoxy, acrylate resin, or ultraviolet hardening resin layer has been formed on the surface.

The substrate having the tracking groove is a substrate having a groove whose depth is equal to λ/10n', (n' is a refractive index of the substrate material) or more on all of or a part of the substrate surface when a recording/reproducing wavelength is set to λ. The groove can be continuously formed by one circumference or can be divided on the halfway. A width of groove can be different in dependence on the location. It is also possible to use a substrate of a sampling servo format on which no groove portion exists, a substrate by another tracking system, a substrate by another format, or the like. It is also possible to use a substrate having a format in which the recording and reproduction can be performed to both groove portion and land portion or a substrate of a format in which the recording is performed to either of them. A disk size is not limited to 12 cm but can be set to any other size such as 13 cm, 3.5', 2.5', or the like. A thickness of disk is also not limited to 0.6 mm but can be set to any other thickness such as 1.2 mm, 0.8 mm, or the like.

In the embodiment, two disk members are formed by substantially the same method and second reflection layers 7 and 7' of the first and second disk members are adhered through an adhesive layer. However, in place of the second disk member, a disk member of another construction, a substrate for protection, or the like can be used. When a transmittance in a ultraviolet wavelength region of the disk members which are used for adhesion or the substrate for protection is large, the disk members can be adhered by the ultraviolet hardening resin. They can be adhered by another method.

In the embodiment, two disk members are formed and the second reflection layers 7 and 7' of the first and second disk members are adhered through an adhesive layer. However, if the ultraviolet hardening resin of a thickness of about 10 μm is coated onto the second reflection layers 7 and 7' of the first and second disk members prior to adhering and the disk members are adhered after the ultraviolet hardening resin was hardened, an error rate can be further reduced.

Film Thickness and Material of Each Layer

Although the recording and reproducing characteristics and the like are improved even by merely setting each of the film thickness and the material of each layer into a sole preferable range, by combining the preferable ranges, the effect is further raised.

(2) EMBODIMENT 2

Construction, Manufacturing Method

Figure 2:
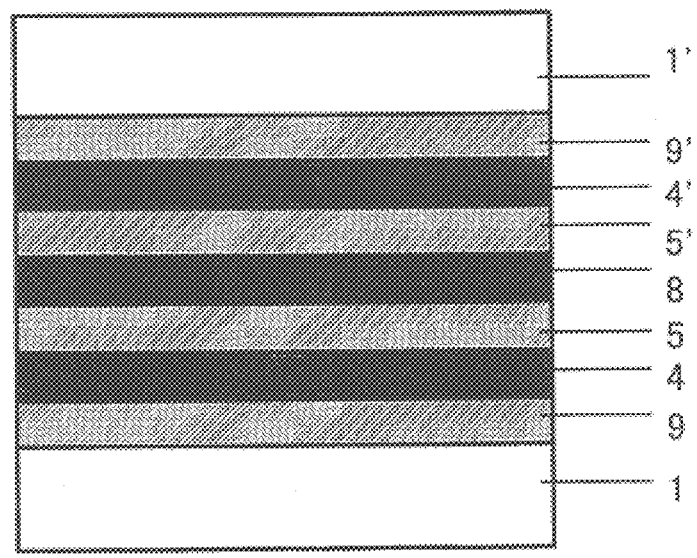
FIG. 2 is a structure cross sectional diagram of an information recording medium of a conventional structure.

FIG. 2 shows a structure cross sectional view of a conventional disk-shaped information recording medium in which a reflection layer is constructed by only one layer. This medium is obtained by a similar manufacturing method. A protection layer 9 made of a $(ZnS)_{80}(SiO_2)_{20}$ film and having a film thickness of about 95 nm, the $Ge_{18}Sb_{26}Te_{56}$ recording layer 4 having a film thickness of about 18 nm, the intermediate layer 5 made of a $(ZnS)_{80}(SiO_2)_{20}$ film and having a film thickness of about 20 nm, and a reflection layer 10 made of an $Al_{95}Cr_5$ film and having a film thickness of about 200 nm are sequentially formed on the polycarbonate substrate 1. Two disk members formed similarly are adhered, so that the disk-shaped information recording medium shown in FIG. 2 is obtained.

Recording and Reproducing Characteristics

The initial crystallization, recording, erasure, reproduction, and the like are performed by a method similar to that of the embodiment 1.

In the information recording medium of the conventional structure of the embodiment, when the recording and erasure are repeated, as shown in FIG. 4, in case of rewriting 2 to 10 times, the jitter is largely increased as compared with that of the information recording medium disclosed in the embodiment 1. The width of area where a large distortion of the reproduction signal waveform occurs as a result that the recording film flows and the film material lacks in the recording start portion and is accumulated in the end portion is examined, so that it is equal to 20 bytes in the start portion and 30 bytes in the end portion, so that the deterioration occurs, particularly, in the end portion.

Spectral Characteristics of the Information Recording Medium

Two test pieces having the same construction as that of the foregoing disk member except for a point that glass is substituted for the substrate are formed and spectral characteristics are examined. A measurement similar to that of the embodiment 1 is performed, so that the reflectance change before and after the recording/reproducing wavelength 100 nm in the as-depo state or crystal state is equal to 5% or more.

(3) EMBODIMENT 3

Construction, Manufacturing Method

The following disk-shaped information recording medium is formed in a manner similar to the embodiment 1 except that $Ag_2Ge_{16}Sb_{26}Te_{56}$ is substituted for $Ge_{18}Sb_{26}Te_{56}$ in the recording layer 4 in the embodiment 1. That is, in the information recording medium in the embodiment 3, the first protection layer 2 made of a $(ZnS)_{80}(SiO_2)_{20}$ film and having a film thickness of about 90 nm is formed on the polycarbonate substrate 1 having a diameter of 12 cm and a thickness of 0.6 mm and having a continuous groove on the surface. Subsequently, the second protection layer 3 made of $Al_2O_3$ and having a film thickness of about 5 nm, the $Ag_2Ge_{16}Sb_{26}Te_{56}$ recording layer 4 having a film thickness of about 18 nm, the intermediate layer 5 made of a $(ZnS)_{80}(SiO_2)_{20}$ film and having a film thickness of about 20 nm, the first reflection layer 6 made of an $Al_{94}Cr_6$ film and having a film thickness of about 70 nm, and the second reflection layer 7 made of an $Al_{99}Ti_1$, film and having a film thickness of about 70 nm are sequentially formed. The laminate film is formed by a magnetron sputtering apparatus. The first disk member is obtained in this manner.

The second disk member having the same construction as that of the first disk member is obtained by substantially the same method. In the second disk member, the first protection layer 2' made of a $(ZnS)_{80}(SiO_2)_{20}$ film and having a film thickness of about 90 nm, the second protection layer 3' made of an $Al_2O_3$ film and having a film thickness of about 5 nm, the recording layer 4' made of $Ag_2Ge_{16}Sb_{26}Te_{56}$ and having a film thickness of about 18 nm, the intermediate layer 5' made of a $(ZnS)_{80}(SiO_2)_{20}$ film and having a film thickness of about 20 nm, the first reflection layer 6' made of an $Al_{94}Cr_6$ film and having a film thickness of about 70 nm, and the second reflection layer 7' made of an $Al_{99}Ti_1$ film and having a film thickness of about 70 nm are sequentially laminated on the substrate 1' having a diameter of 12 cm and a thickness of 0.6 mm.

After that, the second reflection layers 7 and 7' of the first and second disk members are adhered through the adhesive layer 8, so that the disk-shaped information recording medium is obtained.

Recording and Reproducing Characteristics

The recording and reproducing characteristics are examined by a method similar to that in the embodiment 1, so that it has been found that in case of the Ag—Ge—Sb—Te recording film, when the rewriting is performed a number of times, the number of rewriting times in which the jitter of the front edge increases by 5% or more is improved twice as compared with that in Ge—Sb—Te.

Recording Film Compositions

In the compositions of the recording film used in the recording layers 4 and 4' in the embodiment, the Sb and Te amounts are made constant, the Ge and Ag amounts are changed, and the jitter ($\sigma$/Tw) of the front edge after the rewriting was performed five times is measured, so that the following results are obtained. The number of rewriting times in which the jitter increases by 5% or more is examined.

| Compositions of recording film | Jitter (%) | The number of rewriting times |
|---|---|---|
| $Ge_{18}Sb_{26}Te_{56}$ | 9 | 1 |
| $Ag_1Ge_{17}Sb_{26}Te_{56}$ | 10 | 1.5 |
| $Ag_2Ge_{16}Sb_{26}Te_{56}$ | 11 | 2 |
| $Ag_4Ge_{14}Sb_{26}Te_{56}$ | 12 | 2 |
| $Ag_6Ge_{12}Sb_{26}Te_{56}$ | 20 | — |
| $Ag_8Ge_{10}Sb_{26}Te_{56}$ | 30 | — |

Thus, when a small amount of Ag is added, the number of rewriting times is improved. However, it has been found that the jitter increases with an increase in Ag amount. Therefore, a range of z where the erasing ratio shows excellent characteristics is $0 \leq w \leq 0.06$ and a range of z where the erasing ratio shows more excellent characteristics is $0 \leq z \leq 0.04$.

As an element which is added into the recording film in place of Ag, it has been found that even if it is substituted by at least any one of Na, Mg, Al, P, S, Cl, K, Ca, Sc, Zn, Ga, As, Se, Br, Rb, Sr, Y, Zr, Nb, Ru, Rh, Cd, In, Sn, I, Cs, Ba, La, Hf, Ta, Re, Os, Ir, Hg, Tv, Pb, Th, U, Cr, W, Mo, Pt, Co, Ni, Pd, Si, Au, Cu, V, Mn, Fe, Ti, and Bi, it is difficult to raise the jitter at the time of rewriting of a number of times.

Among them, there are effects that, particularly, by adding Ag, the recording sensitivity is also improved by 10% as compared with that of Ge—Sb—Te, and by adding at least any one of Cr, W, and Mo, when the number of rewriting times in which the jitter increases by 5% or more when the rewriting is performed a number of times is improved to 3 times or more as compared with that of Ge—Sb—Te, and by adding at least any one of Pt, Co, and Pd, the crystallization temperature is raised by 50° C. or more as compared with that of Ge—Sb—Te.

It has been found that when an amount of impurity elements in the recording film exceeds 2 atom %, the jitter of the front edge or the rear edge after the rewriting was performed once exceeds 10%. Further, it has been found that when an amount of impurity elements exceeds 5 atom %, the jitter is equal to 13% or more. Therefore, it is preferable that an amount of impurity elements in the recording film is equal to or less than 5 atom % because the deterioration of the rewriting characteristics can be reduced. If it is equal to or less than 2 atom %, it is further preferable.

In the embodiment, the film thickness of the recording film used in the recording layers 4 and 4' is changed in the embodiment and the jitter ($\sigma$/Tw) after the rewriting of 10 times and after the rewriting of 100,000 times are measured, so that the following results are obtained. For the film thickness (nm) of the recording film, with respect to the results after the rewriting of 10 times, the worse value (%) of the jitter of the front edge or rear edge is shown, and with regard to the results after the rewriting of 100,000 times, the jitter value (%) of the front edge is shown.

| Film thickness of recording film | Jitter after rewriting of 10 times | Jitter after rewriting of 100,000 times |
|---|---|---|
| 8 | 16 | — |
| 10 | 12 | — |
| 13 | 10 | 10 |
| 18 | 9 | 10 |
| 20 | 10 | 10 |
| 30 | — | 13 |
| 40 | — | 17 |

It has been found that the jitter after the rewriting increases and when the film thickness is made thick, the jitter after the rewriting of 100,000 times increases. Thus, it is preferable that the film thickness of the recording film is equal to 10 nm or more and is equal to 30 nm or less and, more preferably, it is equal to 13 nm or more and is equal to 20 nm or less.

(4) EMBODIMENT 4

Construction, Manufacturing Method

The following information recording medium is formed in a manner similar to that of the embodiment 1 except that $(Al_2O_3)_{70}(AnS)_{10}(SiO_2)_{20}$ is substituted for $(ZnS)_{80}(SiO_2)_{20}$ in the first protection layer 2 in the embodiment 1 and the second protection layer is removed. That is, in the information recording medium in the embodiment 3, the first protection layer 2 made of $(Al_2O_3)_{70}(ZnS)_{10}(SiO_2)_{20}$ and having a film thickness of about 95 nm, the $Ge_{18}Sb_{26}Te_{56}$ recording layer 4 having a film thickness of about 18 nm, the intermediate layer 5 made of a $(ZnS)_{80}(SiO_2)_{20}$ film and having a film thickness of about 20 nm, the first reflection layer 6 made of an $Al_{75}Ti_{25}$ film and having a film thickness of about 100 nm, and the second reflection layer 7 made of an $Al_{99}Ti_1$ film and having a film thickness of about 100 nm are sequentially formed on the polycarbonate substrate 1 having a diameter of 12 cm and a thickness of 0.6 mm and having a continuous groove on the surface. The laminate film is formed by the magnetron sputtering apparatus. The first disk member is obtained in this manner.

On the other hand, the second disk member having the same construction as that of the first disk member is obtained by substantially the same method. In the second disk member, the first protection layer 2' made of $(Al_2O_3)_{70}(ZnS)_{10}(SiO_2)_{20}$ and having a film thickness of about 95 nm, the recording layer 4' made of a $Ge_{18}Sb_{26}Te_{56}$ film and having a film thickness of about 18 nm, the intermediate layer 5' made of a $(ZnS)_{80}(SiO_2)_{20}$ film and having a film thickness of about 20 nm, the first reflection layer 6' made of an $Al_{94}Cr_6$ film and having a film thickness of about 70 nm, and the second reflection layer 7' made of an $Al_{99}Ti_1$ film and having a film thickness of about 70 nm are sequentially laminated on the substrate 1' having a diameter of 12 cm and a thickness of 0.6 mm.

After that, the second reflection layers 7 and 7' of the first and second disk members are adhered through the adhesive layer 8, so that the disk-shaped information recording medium shown in FIG. 1 is obtained.

Recording and Reproducing Characteristics

The recording and reproducing characteristics are examined by a method similar to that in the embodiment 1, so that it has been found that in case of the conventional disk in which the protection layer material is made of $(ZnS)_{80}(SiO_2)_{20}$, although the reflectance level change which is caused after the rewriting of 100,000 times occurs by 20% or more, it has been found that it can be reduced to 10% or less in the disk of the embodiment. However, the recording sensitivity deteriorates by about 5%.

In the disk of the embodiment, since $(Al_2O_3)_{70}(ZnS)_{10}(SiO_2)_{20}$ is substituted for $(ZnS)_{80}(SiO_2)_{20}$ and the second protection layer is removed, the disk forming time can be reduced by the time corresponding to one layer as compared with that of the disk of the embodiment 1.

Protection Layer

Although the first protection layer 2 is formed by $(Al_2O_3)_{70}(ZnS)_{10}(SiO_2)_{20}$ in the embodiment, if 70 mol % or more of the protection layer component consists of Al—O, since the reflectance level reduction can be suppressed to 5% or less, it is preferable. In ZnS, a sputtering rate is large and, if an amount of ZnS is large, the film forming time can be reduced, and when 70 mol % or more of the whole protection layer consists of ZnS, the film forming time of this layer can be reduced to ½ or less.

As a material which is substituted for $Al_2O_3$ in the mixture material of $(Al_2O_3)_{70}(ZnS)_{10}(SiO_2)_{20}$, $SiO_2$ or a mixture material of $Al_2O_3$ and $SiO_2$ is preferable. $Ta_2O_5$ is subsequently preferable and $ZrO_2$—$Y_2O_3$ or a mixture material of them and $Al_2O_3$ and $SiO_2$ is subsequently preferable. In place of $Al_2O_3$ in the mixture material, it is preferable to use a Cr—O system material such as $Cr_2O_3$, CrO, or the like, a Co—O system material such as $Co_2O_3$, CoO, or the like, a material of compositions close to them, or a mixture material of them because the adhesive strength between the protection layer and the recording film becomes strong.

As a material which is substituted for $(ZnS)_{30}(SiO_2)_{20}$, a material in which a mixture ratio of ZnS and $SiO_2$ is changed, an Si—N system material, an Si—O—N system material, an oxide such as $SiO_2$, SiO, $TiO_2$, $Al_2O_3$, $Y_2O_3$, $CeO_2$, $La_2O_3$, $In_2O_3$, GeO, $GeO_2$, PbO, SnO, $SnO_2$, BeO, $Bi_2O_3$, $TeO_2$, $WO_2$, $WO_3$, $Sc_2O_3$, $Ta_2O_5$, $ZrO_2$, $Cu_2O$, MgO, or the like, a nitride such as TaN, AlN, BN, $Si_3N_4$, GeN, Al—Si—N system material (for example, $AlSiN_2$), or the like, a sulfide such as ZnS, $Sb_2S_3$, CdS, $In_2S_3$, $Ga_2S_3$, GeS, $SnS_2$, PbS, $Bi_2Se_3$, or the like, a selenide such as $SnSe_2$, $Sb_2Se_3$, CdSe, ZnSe, $In_2Se_3$, $Ga_2Se_3$, GeSe, $GeSe_2$, SnSe, PbSe, $Bi_2Se_3$, or the like, a fluoride such as $CeF_3$, $MgF_2$, $CaF_2$, or the like, Si, Ge, $TiB_2$, $B_4C$, B, C, or a material made of a composition close to the above materials. A layer of those mixture materials or a multilayer of them can be used.

In case of such a protection layer, it is preferable that a film thickness of the whole protection layer is equal to 80 to 110 nm because the modulation degree upon recording can be increased.

When the recording film shown in the embodiment 3 and the protection layer in the present embodiment are combined, effects of both of them are obtained.

In not only the disk of the structure shown in the invention but also the disk with the conventional structure and another phase change disk having a protection layer, by providing the protection layer disclosed in the embodiment, there is an effect of reducing the reflectance level change occurring at the time of rewriting of a number of times.

Items which are not disclosed in the embodiment are similar to those in the embodiments 1 and 3.

(5) EMBODIMENT 5

Construction, Manufacturing Method

The following information recording medium is formed in a manner similar to the embodiment 1 except that $Al_{90}Ti_{10}$ is substituted for $Al_{94}Cr_6$ in the first reflection layer 6 and $Al_{98}Ti_2$ is substituted for $Al_{99}Ti_1$ in the second reflection layer 7 in the embodiment 1.

That is, in the information recording medium in the embodiment 4, the first protection layer 2 made of a $(ZnS)_{80}(SiO_2)_{20}$ film and having a film thickness of about 90 nm, the second protection layer 3 made of $Al_2O_3$ and having a film thickness of about 5 nm, the $Ge_{18}Sb_{26}Te_{56}$ recording layer 4 having a film thickness of about 18 nm, the intermediate layer 5 made of a $(ZnS)_{80}(SiO_2)_{20}$ film and having a film thickness of about 20 nm, the first reflection layer 6 made of an $Al_{90}Ti_{10}$ film and having a film thickness of about 100 nm, and the second reflection layer 7 made of an $Al_{98}Ti_2$ film and having a film thickness of about 100 nm are sequentially formed on the polycarbonate substrate 1 having a diameter of 12 cm and a thickness of 0.6 mm and having a continuous groove on the surface. The laminate film is formed by the magnetron sputtering apparatus. In this manner, the first disk member is obtained.

On the other hand, the second disk member having the same construction as that of the first disk member is obtained by substantially the same method. The second reflection layers 7 and 7' of the first and second disk members obtained by substantially the same method as mentioned above are adhered, so that the disk-shaped information recording medium is obtained.

Recording and Reproducing Characteristics

The recording and reproducing characteristics are examined by a method similar to that in the embodiment 1, so that it has been found that there is an effect that the jitter value can be reduced as compared with that of the disk with the conventional structure in a manner similar to the embodiment 1.

Reflection Layer

As a material of the first reflection layer in place of Al—Ti used in the first reflection layer 6 in the embodiment, a material containing an Al alloy such as Al—Cr, Al—Ag, Al—Cu, or the like as a main component is preferable.

In case of the Al alloy, if a content of the elements other than Al in the Al alloy is set to a value within a range of 5 atom % or more and 30 atom % or less, the characteristics at the time of rewriting of a number of times are further improved. Similar characteristics are obtained even in case of Al alloys other than those mentioned above.

Subsequently, it is also possible to use a layer made of a sole element such as Au, Ag, Cu, Ni, Fe, Co, Cr, Ti, Pd, Pt, W, Ta, Mo, Sb, Bi, Dy, Cd, Mn, Mg, or V, an alloy containing Au alloy, Ag alloy, Cu alloy, Pd alloy, Pt alloy, Sb—Bi, SUS, Ni—Cr, or the like as a main component, or an alloy of them. A multilayer made of those layers can be used. A composite layer of each of those elements and another material such as an oxide, a composite layer of each of those elements and another substance such as another metal, or the like can be used.

Among them, in case of a material having a large reflectance such as Cu alloy, Al alloy, Au alloy, or the like, a modulation degree is large and excellent reproducing characteristics are obtained. Similar characteristics are also obtained in case of the Ag alloy or the like. If a content of the elements other than the main component such as Cu, Au, Ag, or the like serving as a main component in this case is set to a value within a range of 5 atom % or more and 30 atom % or less, the characteristics are further improved.

As a material of the second reflection layer in place of Al—Ti used in the second reflection layer 7 in the embodiment, a material containing an At alloy such as Al—Ti, Al—Ag, Al—Cu, Al—Cr, or the like as a main component is preferable. At can be also used.

In case of the Al alloy, it has been found that if a content of the elements other than Al in the Al alloy is set to a value within a range of 0.5 atom % or more and 4 atom % or less, the excellent rewriting characteristics are obtained and that when it is set to a value within a range of 1 atom % or more and 2 atom % or less, they are further improved. Similar characteristics are obtained even in case of Al alloys other than those mentioned above.

Subsequently, it is also possible to use a layer made of a sole element such as Au, Ag, Cu, Al, Ni, Fe, Co, Cr, Ti, Pd, Pt, W, Ta, Mo, Sb, Bi, Dy, Cd, Mn, Mg, or V, an alloy containing Au alloy, Ag alloy, Cu alloy, Pd alloy, Pt alloy, Sb—Bi, SUS, Ni—Cr, or the like as a main component, or an alloy of them. A multilayer made of those layers can be used. A composite layer of each of those elements and another material such as an oxide, a composite layer of each of those elements and another substance such as another metal, or the like can be used.

Among them, in case of a material having a large heat conductivity such as Cu, Al, Au, Cu alloy, Al alloy, Au alloy, or the like, the disk can be easily quenched and excellent rewriting characteristics are obtained. In case of Ag, Ag alloy, and the like, similar characteristics are derived. It has been found that if a content of the elements other than Cu, Au, Ag, or the like serving as a main component in this case is set to a value within a range of 0.5 atom % or more and 4 atom % or less, the excellent rewriting characteristics are obtained and are more improved when it lies within a range of 1 atom % or an more and 2 atom % or less.

The refractive indices (n) and attenuation coefficients (k) of the materials of the first and second reflection layers are examined. Thus, if n of the first reflection layer is larger than n of the second reflection layer and k of the first reflection layer is smaller than k of the second reflection layer, the increase in jitter at the time of rewriting of 100,000 times can be suppressed to 4% or less.

It is preferable that the material of each of the first and second reflection layers is equal to or larger than 95% of the total number of atoms of each reflection layer. When an amount of impurities other than the above materials is equal to or larger than 5 atom %, deterioration of the rewriting characteristics such that the number of rewriting times is reduced to ½ or less or the like occurs.

It is preferable to set the film thickness of the first reflection layer to 30 nm or more in order to increase the strength and the thermal diffusion and to set it to 150 nm or less in order to reduce the forming time. It is more preferable to set it to 40 nm to 120 nm.

It is desirable to set the film thickness of the second reflection layer to 30 nm or more in order to increase the strength and the thermal diffusion and to set it to 150 nm or less in order to reduce the forming time. It is more desirable to set it to 40 nm to 120 nm.

Combination of the First Reflection Layer Material and the Second Reflection Layer Material Although the materials which have already been mentioned in the embodiment can be used with respect to the materials of the first and second reflection layers, it has been found that by selecting a combination of them, the increase in jitter at the time of rewriting of 100,000 times can be suppressed to 4% or less and the rewriting characteristics are improved. Preferable combinations are obtained in the case where the main component elements contained in the first and second reflection layers are the same and with respect to the elements other than Al of the main component elements, a content of the second reflection layer is larger than that of the first reflection layer. For example, there are the following cases. The first reflection layer is an $Al_{94}Cr_6$ film and the second reflection layer is $Al_{99}Ti_1$. The first reflection layer is an $Al_{90}Ti_{10}$ film and the second reflection layer is $Al_{98}Ti_2$. The first reflection layer is an $Al_{75}Ti_{25}$ film and the second reflection layer is $Al_{99}Ti_1$. And the like.

Even in case of a combination of Al—Ti and Al—Ti or Al—Cr and Al—Cr, or even in case of combinations other than Al—Ti and Al—Cr, similar characteristics are obtained by using a combination mainly containing an Al alloy such as Al—Ag, Al—Cu, or the like. Subsequently, in case of the Au alloy, Ag alloy, Cu alloy, or compositions close to them, the rewriting characteristics at the time of rewriting of a number of times are improved.

Among them, when the elements other than the main component are the same as in the case where the first reflection layer is made of the $Al_{90}Ti_{10}$ film and the second reflection layer is made of $Al_{98}Ti_2$, since the heat is likely to escape from the recording film into the reflection layer, in the jitter after the rewriting of 10 times, a recording power margin in which both the jitter of the front edge and the jitter of the rear edge decrease is widened by 5%.

Items which are not disclosed in the embodiment are similar to the embodiments 1, 3, and 4.

(6) EMBODIMENT 6

Construction, Manufacturing Method

The following information recording medium is formed in a manner similar to the embodiment 1 except that $Al_2O_3$ of 30 nm and $(ZnS)_{80}(SiO_2)_{20}$ of 50 nm are substituted for $(ZnS)_{80}(SiO_2)_{20}$ in the first protection layer 2 in the embodiment 5.

That is, in the information recording medium in the embodiment 4, the first protection layer 2 made of $Al_2O_3$ having a film thickness of about 30 nm and a $(ZnS)_{80}(SiO_2)_{20}$ film having a film thickness of about 50 nm, the second protection layer 3 made of $Al_2O_3$ and having a film thickness of about 5 nm, the $Ge_{18}Sb_{26}Te_{56}$ recording layer 4 having a film thickness of about 18 nm, the intermediate layer 5 made of a $(ZnS)_{80}(SiO_2)_{20}$ film and having a film thickness of about 20 nm, the first reflection layer 6 made of an $Al_{90}Ti_{10}$ film and having a film thickness of about 100 nm, and the second reflection layer 7 made of an $Al_{99}Ti_1$ film and having a film thickness of about 100 nm are sequentially formed on the polycarbonate substrate 1 having a diameter of 12 cm and a thickness of 0.6 mm and having a continuous groove on the surface. The laminate film is formed by the magnetron sputtering apparatus. In this manner, the first disk member is obtained.

On the other hand, the second disk member having the same construction as that of the first disk member is obtained by substantially the same method. In the second disk member, the first protection layer 2' made of $Al_2O_3$ and having a film thickness of about 30 nm and a $(ZnS)_{80}(SiO_2)_{20}$ film having a film thickness of about 50 nm, the second protection layer 3' made of an $Al_2O_3$ film and having a film thickness of about 5 nm, the recording layer 4' made of a $Ge_{18}Sb_{26}Te_{56}$ film and having a film thickness of about 18 nm, the intermediate layer 5' made of a $(ZnS)_{80}(SiO_2)_{20}$ film and having a film thickness of about 20 nm, the first reflection layer 6' made of an $Al_{90}Ti_{10}$ film and having a film thickness of about 100 nm, and the second reflection layer 7' made of an $Al_{99}Ti_1$ film and having a film thickness of about 100 nm are sequentially laminated on the substrate 1' having a diameter of 12 cm and a thickness of 0.6 mm.

The second reflection layers 7 and 7' of the first and second disk members obtained by substantially the same method as mentioned above are adhered, so that the disk-shaped information recording medium is obtained.

Recording and Reproducing Characteristics

The recording and reproducing characteristics are examined by a method similar to that in the embodiment 1. In the disk of the embodiment, as compared with the disk in which the material of the first protection layer 2 is made of $(ZnS)_{80}(SiO_2)_{20}$, the thermal diffusion of a portion near the substrate can be easily performed, the thermal deformation in the substrate can be suppressed, and an increase in jitter upon rewriting can be suppressed to 1% or less. In addition, the reflectance level change occurring after the rewriting of 100,000 times can be reduced to about 3% or less by the second protection layer. According to the construction of three layers as mentioned above, since both the effect in the case where the first protection layer is constructed by two layers and the effect in the case where the second protection layer is provided are obtained, although the film forming time becomes long, the excellent rewriting characteristics are obtained and it is further preferable.

Protection Layer Material or the Like

In the embodiment, the first protection layer 2 is made of $Al_2O_3$ and $(ZnS)_{80}(SiO_2)_{20}$ and the second protection layer 3 is made of $Al_2O_3$.

It is preferable that a mol ratio of ZnS in $(ZnS)$—$(SiO_2)$ of the first protection layer 2 is set to 70 mol % or more and 90 mol % or less.

As a material which is substituted for $(ZnS)_{80}(SiO_2)_{20}$ of the first protection layer 2, it is possible to use an Si—N system material, an Si—O—N system material, an oxide such as $SiO_2$, SiO, $TiO_2$, $Al_2O_3$, $Y_2O_3$, $CeO_2$, $La_2O_3$, $In_2O_3$, GeO, $GeO_2$, PbO, SnO, $SnO_2$, BeO, $Bi_2O_3$, $TeO_2$, $WO_2$, $WO_3$, $Sc_2O_3$, $Ta_2O_5$, $ZrO_2$, $Cu_2O$, MgO, or the like, a nitride such as TaN, AlN, BN, $Si_3N_4$, GeN, Al—Si—N system material (for example, $AlSiN_2$), or the like, a sulfide such as ZnS, $Sb_2S_3$, CdS, $In_2S_3$, $Ga_2S_3$, GeS, $SnS_2$, PbS, $Bi_2S_3$, or the like, a selenide such as $SnSe_2$, $Sb_2Se_3$, CdSe, ZnSe, $In_2Se_3$, $Ga_2Se_3$, GeSe, $GeSe_2$, SnSe, PbSe, $Bi_2Se_3$, or the like, a fluoride such as $CeF_3$, $MgF_2$, $CaF_2$, or the like, Si, Ge, $TiB_2$, $B_4C$, B, C, or a material made of a composition close to the above materials. A layer of those mixture materials or a multilayer of them can be used.

As a material which is substituted for $Al_2O_3$ of the first protection layer 2, MgO, BeO, AlN, BN, or $B_4C$ is preferable. $Ta_2O_5$, $SiO_2$, $ThO_2$, $TiO_2$, or SiC is subsequently preferable. If the film thickness of this layer is set to 5 nm or more, the reflectance level change at the time of rewriting of 100,000 times can be suppressed to 10% or less. If it is set to 20 nm or more, the reflectance level change can be suppressed to 5% or less. Further, if it is equal to 70 nm or more, the forming time of the protection layer becomes long and the forming time is doubled because the number of manufacturing step is divided into two or more steps, two or more vacuum chambers for sputtering are provided, or the like. If it is set to 50 nm or less, since the forming time is shorter than those of the other layers, no influence is exerted on the whole forming time. It is, therefore, preferable to set the film thickness to 5 to 70 nm and, more preferable, 20 to 50 nm.

As a material of $Al_2O_3$ of the second protection layer 3, $SiO_2$ or a material in which a mixture ratio of $Al_2O_3$ and $SiO_2$ is changed is desirable. $Ta_2O_5$ is subsequently preferable and $ZrO_2$—$Y_2O_3$ is subsequently preferable. It is preferable that an element ratio in those compounds is equal to a ratio of a metal element and an oxygen element, for example, in the oxide or sulfide or with respect to the metal element and the sulfide element, it is equal to a ratio of 2:3 in case of $Al_2O_3$, $Y_2O_3$, and $La_2O_3$, 1:2 in case of $SiO_2$, $ZrO_2$, and $GeO_2$, 2:5 in case of $Ta_2O_5$, or 1:1 in case of ZnS or a ratio close to it. However, even if the ratio is out of such a ratio, similar effects are obtained. When the ratio is out of the above integer ratio, it is preferable that the deviation of the metal element amount is equal to or less than 10 atom %, namely, for example, the ratio of Al and O in case of Al—O is equal to ±10 atom % or less as an Al amount from $Al_2O_3$, the ratio of Si and O in case of Si—O is equal to ±10 atom % or less as an Si amount from $SiO_2$, or the like. If it is deviated by 10 atom % or more, since optical characteristics change, the modulation degree decreases by 10% or more.

In place of $Al_2O_3$ of the second protection layer 3, it is preferable to use a Cr—O system material such as $Cr_2O_3$, CrO, or the like, a Co—O system material such as $Co_2O_3$, CoO, or the like, a material of compositions close to them, or a mixture material of them because the adhesive strength between the protection layer and the recording film becomes strong. An Ni—O system material or a mixture material of them can be used.

If a nitride such as Ge—N, Si—N, or Al—N system material other than them is used, the crystallization speed rises and there is an effect of reducing the unerased remainder at a high linear velocity. Even in case of forming the layer by adding nitrogen into the recording film material, the crystallization speed rises.

In case of such a protection layer, it is preferable to set the film thickness of the second protection layer to 2 to 30 nm because the deterioration of the recording sensitivity can be set to 10% or less and the forming time can be reduced. It is further preferable to set it to 3 nm or more and 15 nm or less. It is desirable that the film thickness of the whole protection layer is set to 80 to 110 nm because the modulation degree upon recording can be increased.

In not only the disk of the structure shown in the invention but also the disk with the conventional structure and another phase change disk having a protection layer, even if the first and second protection layers disclosed in the embodiment are substituted for the protection layer material, there is an effect of reducing the reflectance level change occurring at the time of rewriting of a number of times.

Items which are not disclosed in the embodiment are similar to those in the embodiments 1 and 3 to 5.

(7) EMBODIMENT 7

Construction, Manufacturing Method

The following information recording medium is formed in a manner similar to the embodiment 1 except that $Al_2O_3$ having a thickness of 5 nm and $(ZnS)_{80}(SiO_2)_{20}$ having a thickness of 15 nm are substituted for $(ZnS)_{80}(SiO_2)_{20}$ in the intermediate layer 5 in the embodiment 1. That is, in the information recording medium in the embodiment 6, the first protection layer 2 made of a $(ZnS)_{80}(SiO_2)_{20}$ film and having a film thickness of about 90 nm, the second protection layer 3 made of an $Al_2O_3$ film and having a film thickness of about 5 nm, the $Ge_{18}Sb_{26}Te_{56}$ recording layer 4 having a film thickness of about 18 nm, the intermediate layer 5 having a film thickness of about 20 nm and consisting of $Al_2O_3$ having a film thickness of 5 nm and $(ZnS)_{80}(SiO_2)_{20}$ having a film thickness of 15 nm, the first reflection layer 6 made of an $Al_{75}Ti_{25}$, film and having a film thickness of about 100 nm, and the second reflection layer 7 made of an $Al_{99}Ti_1$ film and having a film thickness of about 100 nm are sequentially formed on the polycarbonate substrate 1 having a diameter of 12 cm and a thickness of 0.6 mm and having a continuous groove on the surface. The laminate film is formed by the magnetron sputtering apparatus. In this manner, the first disk member is obtained.

Recording and Reproducing Characteristics

The recording and reproducing characteristics are examined by a method similar to that in the embodiment 1, so that it has been found that in the disk in which the intermediate layer material is made of $(ZnS)_{80}(SiO_2)_{20}$, although the erasing ratio decreases when the linear velocity upon recording rises, in the disk of the embodiment, even if the linear velocity upon recording is raised to about 1.2 times, the DC erasing ratio can be held to 30 dB or more. As a DC erasing ratio, after the 3T signal was recorded, a change in 3T signal in case of erasing by the DC light is obtained.

Intermediate Layer

In the embodiment, although the intermediate layer 5 is formed by two layers of $Al_2O_3$ and $(ZnS)_{80}(SiO_2)_{20}$, as a material which is substituted for $Al_2O_3$, $SiO_2$ or a material of $Al_2O_3$—$SiO_2$ can be used. When it is changed to $SiO_2$, the increase in jitter at the time of rewriting of a number of times rises as compared with that of $Al_2O_3$. However, even if the linear velocity upon recording is raised to about 1.5 times, the DC erasing ratio can be held to 30 dB or more. If an amount of $SiO_2$ or $Al_2O_3$ contained is equal to 70 atom % or more, the reduction of the reflectance level due to the rewriting of 100,000 times can be suppressed to 5% or less. If 90 atom % or more is contained, it can be suppressed to 3% or less. In place of $Al_2O_3$, $Ta_2O_5$ is subsequently preferable and $ZrO_2$—$Y_2O_3$ is subsequently preferable.

In the case where $Al_2O_3$ or a layer which is substituted for it exists, there is an effect of preventing that $(ZnS)_{80}(SiO_2)_{20}$ of the intermediate layer or a material which is substituted for it is diffused. The reduction of the reflectance level due to the rewriting of 100,000 times can be suppressed to 1% or less. When the intermediate layer is made of only $Al_2O_3$ or the layer which is substituted for it, the recording sensitivity deteriorates by 5%. Therefore, when the intermediate layer is constructed by two or more layers of different materials as mentioned above, although the number of manufacturing steps increases, since there are both effects that an increase in noises is prevented and the diffusion of the protection layer material into the recording film is prevented, it is preferable.

As a combination of the intermediate layer on the reflection layer side and the intermediate layer on the recording film side, $(ZnS)_{80}(SiO_2)_{20}$ and $Al_2O_3$ are preferable because the reflectance level change upon rewriting is small to be 1% or less. As for $(ZnS)_{80}(SiO_2)_{20}$ and $SiO_2$, the DC erasing ratio is equal to 30 dB and the excellent erasing characteristics are obtained. A combination of ZnS and any one of $SiO_2$, $Al_2O_3$, and $Ta_2O_5$ is preferable because the modulation degree is large to be 53% or more.

In place of $Al_2O_3$ of the intermediate layer 5, it is preferable to use a Cr—O system material such as $Cr_2O_3$, CrO, or the like, a Co—O system material such as $Co_2O_3$, CoO, or the like, a material of compositions close to them, or a mixture material of them because the adhesive strength between the protection layer and the recording film becomes strong. An Ni—O system material or a mixture material of them can be used.

If a nitride such as Ge—N, Si—N, or Al—N system material other than them is used, the crystallization speed rises and there is an effect of reducing the unerased remainder at a high linear velocity. Even in case of forming the layer by adding nitrogen into the recording film material, the crystallization speed is large.

In place of forming two layers of $Al_2O_3$ or a material which is substituted for $Al_2O_3$ and $(ZnS)_{80}(SiO_2)_{20}$ or a material which is substituted for $(ZnS)_{80}(SiO_2)_{20}$, if a mixture of both of them is used, although the erasing characteristics when the linear velocity is set to a high speed is worse than that in case of forming two layers, the film forming time can be reduced. In this case, in (ZnS)—($Al_2O_3$)—($SiO_2$), when the linear velocity is increased by 1.1 times, the erasing ratio is equal to 30 dB or more and the film forming time is reduced into about ½ because one layer is formed. Since the erasing ratio is large, it is more preferable. It is more desirable that an amount of Al—O in the intermediate layer is equal to 70 atom % or more of the total number of atoms because the reflectance level change at the time of rewriting of a number of times can be reduced to 5% or less.

It is preferable that a mol ratio of ZnS in (ZnS)—($SiO_2$) of the intermediate layer 5 is equal to 70 mol % or more and 90 mol % or less. This is because when an amount of ZnS exceeds 90 mol %, noises due to a variation of a crystal grain diameter occur and when the rewriting is performed 100,000 times, the jitter increased by 4% or more.

In ZnS, a sputtering rate is large and when an amount of ZnS is large, the film forming time can be reduced. If 70 mol % or more of the whole intermediate layer consists of ZnS, the film forming time of this layer can be reduced into ½ or less.

As a material which is substituted for (ZnS)—($SiO_2$) of the intermediate layer 5, it is possible to use an Si—N system material, an Si—O—N system material, an oxide such as $SiO_2$, SiO, $TiO_2$, $Al_2O_3$, $Y_2O_3$, $CeO_2$, $La_2O_3$, $In_2O_3$, GeO, $GeO_2$, PbO, SnO, $SnO_2$, BeO, $Bi_2O_3$, $TeO_2$, $WO_2$, $WO_3$, $Sc_2O_3$, $Ta_2O_5$, $ZrO_2$, $Cu_2O$, MgO, or the like, a nitride such as TaN, AlN, BN, $Si_3N_4$, GeN, Al—Si—N system material (for example, $AlSiN_2$), or the like, a sulfide such as ZnS, $Sb_2S_3$, CdS, $In_2S_3$, $Ga_2S_3$, GeS, SnS2, PbS, $Bi_2S_3$, or the like, a selenide such as $SnSe_2$, $Sb_2Se_3$l CdSe, ZnSe, $In_2Se_3$, $Ga_2Se_3$, GeSe, $GeSe_2$, SnSe, PbSe, $Bi_2Se_3$, or the like, a fluoride such as $CeF_3$, $MgF_2$, $CaF_2$, or the like, Si, Ge, $TiB_2$, $B_4C$, B, C, or a material made of a composition close to the above materials. A layer of those mixture materials or a multilayer of them can be used.

It is preferable that an element ratio in those compounds is equal to a ratio of a metal element and an oxygen element, for example, in the oxide or sulfide or with respect to the metal element and the sulfide element, it is equal to a ratio of 2:3 in case of $Al_2O_3$, $Y_2O_3$, and $La_2O_3$, 1:2 in case of $SiO_2$, $ZrO_2$, and $GeO_2$, 2:5 in case of $Ta_2O_5$, or 1:1 in case of ZnS or a ratio close to it. However, even if the ratio is out of such a ratio, similar effects are obtained. When the ratio is out of the above integer ratio, it is preferable that the deviation of the metal element amount is equal to or less than 10 atom %, namely, for example, the ratio of Al and O in case of Al—O is equal to ±10 atom % or less as an Al amount from $Al_2O_3$, the ratio of Si and O in case of Si—O is equal to ±10 atom % or less as an Si amount from $SiO_2$, or the like. If it is deviated by 10 atom % or more, since optical characteristics change, the modulation degree decreases by 10% or more.

It is desirable that an amount of the intermediate layer 5 or a material in place of the intermediate layer 5 is equal to or larger than 90% of the total number of atoms of each intermediate layer. When an amount of impurities other than the above material is equal to 10 atom % or more, a deterioration of the rewriting characteristics such that the number of rewriting times is reduced by 50% or more or the like occurs.

When the film thickness of the whole intermediate layer is thinner than 10 nm, the recording sensitivity deteriorates by 5% or more. Further, to suppress the flow of the recording film, it is preferable to set the film thickness to 40 nm or less. The jitter of the rear edge at the time of rewriting of 100,000 times can be suppressed to 13% or less. When it is equal to or less than 30 nm, the jitter can be suppressed to 10% or less. Thus, it is preferable to set the film thickness of the intermediate layer to 10 to 30 nm because the recording and reproducing characteristics are further improved.

If the disk having the protection layer shown in the embodiments 5 and 6 and the intermediate layer of the embodiment are combined, both of those effects are obtained. If the first reflection layer shown in the embodiments 3 and 4 and the intermediate layer of the embodiment are combined, both of those effects are obtained or the like. Both effects are derived owing to the combination.

Items which are not disclosed in the embodiment are similar to those in the embodiments 1 and 3 to 6.

(8) EMBODIMENT 8

Construction, Manufacturing Method

The following information recording medium is formed in a manner similar to the embodiment 1 except that Si is substituted for the first reflection layer made of the first reflection layer $Al_{94}Cr_6$ film in the embodiment 1. That is, in the information recording medium in the embodiment 7, the first protection layer 2 made of a $(ZnS)_{80}(SiO_2)_{20}$ film and having a film thickness of about 90 nm, the second protection layer 3 made of an $Al_2O_3$ film and having a film thickness of about 5 nm, the $Ge_{18}Sb_{26}Te_{56}$ recording layer 4 having a film thickness of about 18 nm, the intermediate layer 5 made of a $(ZnS)_{80}(SiO_2)_{20}$ film and having a film thickness of about 20 nm, the first reflection layer 6 made of an Si film and having a film thickness of about 55 nm, and the second reflection layer 7 made of an $Al_{99}Ti_1$ film and having a film thickness of about 100 nm are sequentially formed on the polycarbonate substrate 1 having a diameter of 12 cm and a thickness of 0.6 mm and having a continuous groove on the surface. The laminate film is formed by the magnetron sputtering apparatus. In this manner, the first disk member is obtained.

On the other hand, the second disk member having the same construction as that of the first disk member is obtained by substantially the same method. After that, the second reflection layers 7 and 7' of the first and second disk members are adhered through the adhesive layer 8, so that the disk-shaped information recording medium is obtained.

Recording and Reproducing Characteristics

The recording and reproducing characteristics are examined by a method similar to that in the embodiment 1, so that it has been found that in the disk of the embodiment, by substituting Si for the $Al_{94}Cr_6$ film of the first reflection layer, although the modulation degree is reduced by about 3%, when the linear velocity is increased by 1.5 times, an increase in jitter is suppressed to a small value to be 4% or less.

First Reflection Layer

As a material of the first reflection layer in place of Si used in the first reflection layer 6 in the embodiment, if Au, Ag, Cu, Al, Ni, Fe, Co, Cr, Ti, Pd, Pt, W, Ta, Mo, Sb, Bi, Dy, Cd, Mn, Mg, V, Zn, Ga, Tl, Pb, C, B, S, or Ge is added into Si, a transmittance of the reflection layer decreases and an absorptance rises, so that the deterioration of the sensitivity can be prevented. In this case, if an amount of Si in the first reflection layer is equal to 80 atom % or less, the absorptance is excessively large and that if the linear velocity is raised up to 1.5 times, an increasing rate of the jitter exceeds 4%.

Among them, a material of Si—Mo or Si—Al as well as Si—Ti is more preferable because a heat conductivity of the first reflection layer can be raised and an optical constant can be set to a proper value. As for an addition amount of the element which is added into Si, it has been found that an amount within a range of 2 atom % or more and 10 atom % or less is more preferable because the reflectance level change at the time of rewriting of a number of times can be reduced to 10% or less and it is particularly desirable to set the addition amount to 3 to 6 atom %.

It is preferable that an amount of material of the first reflection layer is equal to or larger than 95 atom % of the total number of atoms of each reflection layer. When an amount of impurities other than the above materials is equal to 5 atom % or more, there is a deterioration of the rewriting characteristics such that the number of rewriting times is reduced to ½ or less.

Spectral Characteristics of Information Recording Medium

Two similar test pieces are formed by substantially the same construction as that of the disk member except that glass is substituted for the substrate, and the spectral characteristics are examined by the same method as that of the embodiment 1.

Thus, it has been found that in the disk having the first reflection layer mentioned in the embodiment, in a range of a wavelength of 400 nm to 850 nm, a minimal value of the reflectance exists in a range of 100 nm before and after the recording/reproducing wavelength.

By adding Ti, Mo, Al, or the like into Si, the change in reflectance due to the wavelength decreases. Therefore, even when the wavelength upon initialization and the recording/reproducing wavelength are different, the initializing power can be set to the higher sensitivity and it is preferable. Even when the recording wavelength and the reproducing wavelength differ, the recording power or reproducing power can be similarly easily reduced and it is preferable. In case of the Si—Ge system material, since the light absorptance of the recording mark portion can be reduced to a value smaller than those of the portions other than the recording mark, the unerased remainder due to a difference of the light absorptance can be prevented and, further, the number of rewritable times does not decrease.

As another material of the first reflection layer, a sulfide such as Cd—S, In—Se, or the like or a selenide such as Zn—Se, Cd—Se, In—Se, or the like can be used. It is desirable that a refractive index is equal to 3 or more. However, since the heat conductivity is low, an increase rate of the jitter due to the rewriting of 100,000 times rises.

Items which are not disclosed in the embodiment are similar to those in the embodiments 1 and 3 to 7.

As described above, according to the information recording medium of the invention, the excellent recording, reproducing, and rewriting characteristics can be held.

What is claimed is:

1. An information recording medium characterized in that said medium has a structure such that an information recording thin film which is formed on a substrate and records and/or reproduces information by an atomic arrangement change which occurs by receiving an irradiation of light is provided as a recording layer, a protection layer made up of at least two layers each having materials of different compositions is also provided, said protection layer and said recording layer are laminated in order from the light incident side, and at least one reflection layer is subsequently laminated through at least one intermediate layer, said recording layer satisfies

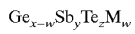

and lies within a range which satisfies $0.13 \leq x \leq 0.22$, $0.20 \leq y \leq 0.32$, $0.53 \leq z \leq 0.60$, $w \leq 0.06$, and $x+y+z=1$ and M includes any one of Na, Mg, Al, P, S, Cl, K, Ca, Sc, Zn, Ga, As, Se, Br, Rb, Sr, Y, Zr, Nb, Ru, Rh, Cd, In, Sn, I, Cs, Ba, La, Hf, Ta, Re, Os, Ir, Hg, Tl, Pb, Th, U, Ag, Cr, W, Mo, Pt, Co, Ni, Pd, Si, Au, Cu, V, Mn, Fe, Ti, and Bi, and said protection layer adjacent to the recording layer has a composition in which at least 90% of a total number of atoms thereof is any one of ($Cr_2O_3$), (CrO), a Cr—O system material, ($Co_2O_3$), (CoO), a Co—O system material and an Ni—O system material, or compositions mixed with them.

2. A medium according to claim 1, characterized in that said M is at least one element selected from a group consisting of Ag, Cr, W, and Mo.

3. A medium according to claim 1, characterized in that said M is at least one element selected from a group consisting of Pd, Pt, and Co.

4. A medium according to claim 1, characterized in that said protection layer includes a layer containing ZnS of 70 mol % or more.

5. A medium according to claim 1, characterized in that said protection layer has a layer of a composition in which at least 90% or more of the total number of atoms is close to any one of (ZnS)—($SiO_2$), (ZnS)—($Al_2O_3$), (ZnS)—($Al_2O_3$)—($SiO_2$), (ZnS)—($Ta_2O_5$), an Si—N system material, an Si—O—N system material, an oxide, a nitride, a sulfide, a selenide, a fluoride, Si, Ge, $TiB_2$, $B_4C$, B, C, $Al_2O_3$, $Ta_2O_5$, $ZrO_2$—$Y_2O_3$, a Cr—O system material, a Co—O system material, an Ni—O system material, a Ge—N system material, an Si—N system material, and an Al—N system material or a layer of mixture compositions of them.

6. A medium according to claim 1, characterized in that said protection layer includes two layers made of materials of different compositions.

7. A medium according to claim 1, characterized in that said protection layer includes at least two layers of a film containing ZnS of 70 mol % or more and a film containing Al—O or Si—O of 70 mol % or more.

8. A medium according to claim 1, characterized in that a component of 95% or more of the total number of atoms of said first reflection layer includes an Al alloy, a sole element such as Au, Ag, Cu, Ni, Fe, Co, Cr, Ti, Pd, Pt, W, Ta, Mo, Sb, Bi, Dy, Cd, Mn, Mg, or V, an alloy containing Au alloy, Ag alloy, Cu alloy, Pd alloy, Pt alloy, Sb—Bi, SUS, or Ni—Cr as a main component, or an alloy of them.

9. A medium according to claim 1, characterized in that a component of 95% or more of the total number of atoms of said second reflection layer includes an Al alloy, a sole element such as Au, Ag, Cu, Ni, Fe, Co, Cr, Ti, Pd, Pt, W, Ta, Mo, Sb, Bi, Dy, Cd, Mn, Mg, or V, an alloy containing Au alloy, Ag alloy, Cu alloy, Pd alloy, Pt alloy, Sb—Bi, SUS, or Ni—Cr as a main component, or an alloy of them.

10. A medium according to claim 1, characterized in that both said first reflection layer and said second reflection layer use any one of Al, Au, Ag, and Cu as a main component element, and a content of elements other than said main component element of said first reflection layer is larger than a content of elements other than said main component element of said second reflection layer.

11. A medium according to claim 1, characterized in that a refractive index of said first reflection layer is larger than a refractive index of said second reflection layer, and an attenuation coefficient of said first reflection layer is smaller than an attenuation coefficient of said second reflection layer.

12. A medium according to claim 1, characterized in that a component of 80% or more of the total number of atoms of said first reflection layer includes Si or a material in which Au, Ag, Cu, Al, Ni, Fe, Co, Cr, Ti, Pd, Pt, W, Ta, Mo, Sb, Bi, Dy, Cd, Mn, Mg, V, Zn, Ga, Tl, Pb, C, B, S, or Ge has been added into Si, a sulfide, or a selenide.

13. A medium according to claim 1, characterized in that a component of 95% or more of the total number of atoms of said first reflection layer includes Si or a mixture or compound of Si and a metal element, and a component of 95% or more of the total number of atoms of said second reflection layer consists of an Al alloy.

14. A medium according to claim 1, characterized in that said intermediate layer includes a layer containing ZnS of 70 mol % or more.

15. A medium according to claim 1, characterized in that said intermediate layer has a layer of a composition in which 90% or more of the total number of atoms is close to any one of (ZnS)—($Al_2O_3$), (ZnS)—($SiO_2$), $SiO_2$, $A_2O_3$, (ZnS)—($Al_2O_3$)—($SiO_2$), an Si—N system material, an Si—O—N system material, an oxide, a nitride, a sulfide, a selenide, a fluoride, Si, Ge, $TiB_2$, $B_4C$, B, C, $Al_2O_3$, $Ta_2O_5$, $ZrO_2$—$Y_2O_3$, a Cr—O system material, a Co—O system material, an Ni—O system material, a Ge—N system material, an Si—N system material, and an Al—N system material, or a layer of mixture compositions of them.

16. A medium according to claim 1, characterized in that said intermediate layer includes two layers made of materials of different compositions.

17. A medium according to claim 1, characterized in that said intermediate layer includes at least two layers of a film containing ZnS of 70 mol % or more and a film containing at least one of Al—O and Si—O of 70 mol % or more.

18. A medium according claim 1, characterized in that a film thickness of said recording film lies within a range of 10 nm or more and 30 nm or less.

19. A medium according to claim 1, characterized in that a film thickness of said protection layer lies within a range of 80 nm or more and 110 nm or less.

20. A medium according to claim 1, characterized in that a film thickness of said intermediate layer lies within a range of 10 nm or more and 30 nm or less.

21. A medium according to claim 1, characterized in that a film thickness of said reflection layer lies within a range of 80 nm or more and 240 nm or less.

22. A medium according to claim 1, characterized in that a film thickness of said first reflection layer lies within a range of 40 nm or more and 120 nm or less.

23. A medium according to claim 1, characterized in that a film thickness of said second reflection layer lies within a range of 40 nm or more and 120 nm or less.

24. An information recording medium characterized in that said medium has a structure such that an information recording thin film which is formed on a substrate and records and/or reproduces information by an atomic arrangement change which occurs by receiving an irradiation of light is provided as a recording layer, at least one protection layer is provided, said protection layer and said recording layer are laminated in order from the light incident side, and at least one refractive layer is subsequently laminated through an intermediate layer made of at least two layers having materials of different compositions, said recording layer satisfies $$Ge_{x-w}Sb_yTe_zM_w$$

and lies within a range which satisfies $$0.13 \leq x \leq 0.22,\ 0.20 \leq y \leq 0.32,$$

$$0.53 \leq z \leq 0.60,\ w \leq 0.06,\ \text{and}\ x+y+z=1$$

and M includes any one of

Na, Mg, Al, P, S, Cl, K, Ca, Sc, Zn, Ga, As, Se, Br, Rb, Sr, Y, Zr, Nb, Ru, Rh, Cd, In, Sn, I, Cs, Ba, La, Hf, Ta, Re, Os, Ir, Hg, Tl, Pb, Th, U, Ag, Cr, W, Mo, Pt, Co, Ni, Pd, Si, Au, Cu, V, Mn, Fe, Ti, and Bi, and said protection layer adjacent to the recording film has a composition in which at least 90% of a total number of atoms is any one of $(Cr_2O_3)$, (CrO), a Cr—O system material, $(Co_2O_3)$, (CoO), a Co—O system material and an Ni—O system material, or compositions mixed with them.

* * * * *

UNITED STATES PATENT AND TRADEMARK OFFICE
CERTIFICATE OF CORRECTION

PATENT NO. : 6,383,595 B1
DATED : May 7, 2002
INVENTOR(S) : Akemi Hirotsune et al.

It is certified that error appears in the above-identified patent and that said Letters Patent is hereby corrected as shown below:

<u>Title page,</u>
Item [22], replace "[22] PCT Filed: Mar. 23, 1999:" with -- [22] PCT filed: Jul. 31, 1998 --

Signed and Sealed this

Seventeenth Day of September, 2002

Attest:

Attesting Officer

JAMES E. ROGAN
*Director of the United States Patent and Trademark Office*